(12) United States Patent
Cummings

(10) Patent No.: US 7,710,632 B2
(45) Date of Patent: May 4, 2010

(54) DISPLAY DEVICE HAVING AN ARRAY OF SPATIAL LIGHT MODULATORS WITH INTEGRATED COLOR FILTERS

(75) Inventor: William J. Cummings, San Francisco, CA (US)

(73) Assignee: QUALCOMM MEMS Technologies, Inc., San Diego, CA (US)

( * ) Notice: Subject to any disclaimer, the term of this patent is extended or adjusted under 35 U.S.C. 154(b) by 132 days.

(21) Appl. No.: 11/051,258

(22) Filed: Feb. 4, 2005

(65) Prior Publication Data

US 2006/0077512 A1 Apr. 13, 2006

Related U.S. Application Data

(60) Provisional application No. 60/623,072, filed on Oct. 28, 2004, provisional application No. 60/613,542, filed on Sep. 27, 2004, provisional application No. 60/613,491, filed on Sep. 27, 2004.

(51) Int. Cl.
G02B 26/00 (2006.01)
G02F 1/00 (2006.01)

(52) U.S. Cl. .................................. 359/290; 359/247

(58) Field of Classification Search ............... 359/289, 359/290, 291, 223, 295, 245, 247, 298, 302
See application file for complete search history.

(56) References Cited

U.S. PATENT DOCUMENTS

| 3,443,854 A | 5/1969 | Weiss |
|---|---|---|
| 3,448,334 A | 6/1969 | Frost |
| 3,653,741 A | 4/1972 | Marks |
| 3,725,868 A | 4/1973 | Malmer, Jr. et al. |
| 4,287,449 A | 9/1981 | Takeda et al. |

(Continued)

FOREIGN PATENT DOCUMENTS

CN 1272922 11/2000

(Continued)

OTHER PUBLICATIONS

Aratani, K. et al. "Surface Micromachined Tuneable Interferometer Array", *Sensors and Actuators A-Physical*, Sequoia S.A., Lausanne, Ch, vol. A43, No. 1/3 May 1, 1994, pp. 17-23.

(Continued)

*Primary Examiner*—William C Choi
(74) *Attorney, Agent, or Firm*—Knobbe Martens Olson & Bear LLP

(57) ABSTRACT

By selectively placing color filters with different transmittance spectrums on an array of modulator elements each having the same reflectance spectrum, a resultant reflectance spectrum for each modulator element and it's respective color filter is created. In one embodiment, the modulator elements in an array are manufactured by the same process so that each modulator element has a reflectance spectrum that includes multiple reflectivity lines. Color filters corresponding to multiple colors, such as red, green, and blue, for example, may be selectively associated with these modulator elements in order to filter out a desired wavelength range for each modulator element and provide a multiple color array. Because the modulator elements are manufactured by the same process, each of the modulator elements is substantially the same and common voltage levels may be used to activate and deactivate selected modulation.

24 Claims, 12 Drawing Sheets

U.S. PATENT DOCUMENTS

| | | |
|---|---|---|
| 4,377,324 A | 3/1983 | Durand et al. |
| 4,389,096 A | 6/1983 | Hori et al. |
| 4,441,791 A | 4/1984 | Hornbeck |
| 4,790,635 A | 12/1988 | Apsley |
| 4,832,459 A | 5/1989 | Harper |
| 4,859,060 A | 8/1989 | Katagari et al. |
| 4,961,617 A | 10/1990 | Shahidi |
| 4,980,775 A | 12/1990 | Brody |
| 4,982,184 A | 1/1991 | Kirkwood |
| 5,022,745 A | 6/1991 | Zayhowski et al. |
| 5,044,736 A | 9/1991 | Jaskie et al. |
| 5,136,669 A | 8/1992 | Gerdt |
| 5,142,414 A | 8/1992 | Koehler |
| 5,168,406 A | 12/1992 | Nelson |
| 5,192,946 A | 3/1993 | Thompson et al. |
| 5,228,013 A | 7/1993 | Bik et al. |
| 5,233,385 A | 8/1993 | Sampsell |
| 5,287,215 A | 2/1994 | Warde et al. |
| 5,293,272 A | 3/1994 | Jannson et al. |
| 5,311,360 A | 5/1994 | Bloom et al. |
| 5,345,322 A | 9/1994 | Fergason |
| 5,365,283 A | 11/1994 | Doherty et al. |
| 5,398,170 A | 3/1995 | Lee |
| 5,401,983 A | 3/1995 | Jokerst et al. |
| 5,448,314 A | 9/1995 | Heimbuch et al. |
| 5,452,024 A | 9/1995 | Sampsell |
| 5,452,385 A | 9/1995 | Izumi |
| 5,457,900 A | 10/1995 | Roy |
| 5,517,347 A | 5/1996 | Sampsell |
| 5,550,373 A | 8/1996 | Cole et al. |
| 5,589,852 A | 12/1996 | Thompson et al. |
| 5,619,059 A | 4/1997 | Li et al. |
| 5,619,365 A | 4/1997 | Rhoads et al. |
| 5,619,366 A | 4/1997 | Rhoads et al. |
| 5,636,185 A | 6/1997 | Brewer et al. |
| 5,638,084 A | 6/1997 | Kalt |
| 5,657,099 A | 8/1997 | Doherty et al. |
| 5,737,115 A | 4/1998 | Mackinlay |
| 5,739,945 A | 4/1998 | Tayebati |
| 5,745,281 A | 4/1998 | Yi et al. |
| 5,754,260 A | 5/1998 | Ooi |
| 5,771,321 A | 6/1998 | Stern |
| 5,805,117 A | 9/1998 | Mazurek |
| 5,815,229 A | 9/1998 | Shapiro |
| 5,835,255 A | 11/1998 | Miles |
| 5,853,310 A | 12/1998 | Nishimura |
| 5,868,480 A | 2/1999 | Zeinali |
| 5,892,598 A | 4/1999 | Asakawa et al. |
| 5,914,804 A | 6/1999 | Goossen |
| 5,933,183 A | 8/1999 | Enomoto et al. |
| 5,959,763 A | 9/1999 | Bozler et al. |
| 5,986,796 A | 11/1999 | Miles |
| 5,991,073 A | 11/1999 | Woodgate |
| 6,028,690 A | 2/2000 | Carter et al. |
| 6,031,653 A | 2/2000 | Wang |
| 6,040,937 A | 3/2000 | Miles |
| 6,046,840 A | 4/2000 | Huibers |
| 6,055,090 A | 4/2000 | Miles |
| 6,057,878 A | 5/2000 | Ogiwara |
| 6,088,102 A | 7/2000 | Manhart |
| 6,113,239 A | 9/2000 | Sampsell et al. |
| 6,147,728 A | 11/2000 | Okumura |
| 6,195,196 B1 | 2/2001 | Kimura et al. |
| 6,201,633 B1 | 3/2001 | Peeters et al. |
| 6,243,149 B1 | 6/2001 | Swanson et al. |
| 6,282,010 B1 | 8/2001 | Sulzbach |
| 6,285,424 B1 | 9/2001 | Yoshida |
| 6,288,824 B1 | 9/2001 | Kastalsky |
| 6,301,000 B1 | 10/2001 | Johnson |
| 6,323,834 B1 | 11/2001 | Colgan et al. |
| 6,342,970 B1 | 1/2002 | Sperger et al. |
| 6,356,378 B1 * | 3/2002 | Huibers ...................... 359/291 |
| 6,381,022 B1 | 4/2002 | Zavracky |
| 6,400,738 B1 | 6/2002 | Tucker |
| 6,412,969 B1 | 7/2002 | Torihara |
| 6,466,358 B2 | 10/2002 | Tew |
| 6,483,613 B1 | 11/2002 | Woodgate et al. |
| 6,549,338 B1 | 4/2003 | Wolverton et al. |
| 6,570,584 B1 | 5/2003 | Cok et al. |
| 6,574,033 B1 | 6/2003 | Chui |
| 6,597,419 B1 | 7/2003 | Okada et al. |
| 6,597,490 B2 | 7/2003 | Tayebati |
| 6,598,987 B1 | 7/2003 | Parikka |
| 6,636,322 B1 | 10/2003 | Terashita |
| 6,642,913 B1 | 11/2003 | Kimura et al. |
| 6,643,069 B2 | 11/2003 | Dewald |
| 6,650,455 B2 | 11/2003 | Miles |
| 6,657,611 B1 | 12/2003 | Sterken |
| 6,674,562 B1 | 1/2004 | Miles |
| 6,680,792 B2 | 1/2004 | Miles |
| 6,738,194 B1 | 5/2004 | Ramirez et al. |
| 6,747,785 B2 | 6/2004 | Chen et al. |
| 6,768,555 B2 * | 7/2004 | Chen et al. .................. 356/519 |
| 6,773,126 B1 | 8/2004 | Hatjasalo et al. |
| 6,798,469 B2 | 9/2004 | Kimura |
| 6,806,924 B2 | 10/2004 | Niiyama |
| 6,811,267 B1 | 11/2004 | Allen et al. |
| 6,822,628 B2 | 11/2004 | Dunphy et al. |
| 6,822,780 B1 | 11/2004 | Long, Jr. |
| 6,825,969 B2 | 11/2004 | Chen |
| 6,841,787 B2 | 1/2005 | Almogy |
| 6,853,129 B1 | 2/2005 | Cummings et al. |
| 6,862,029 B1 | 3/2005 | D'Souza et al. |
| 6,867,896 B2 | 3/2005 | Miles |
| 6,870,581 B2 | 3/2005 | Li et al. |
| 6,880,959 B2 | 4/2005 | Houston |
| 6,882,458 B2 | 4/2005 | Lin et al. |
| 6,885,377 B2 | 4/2005 | Lim |
| 6,912,022 B2 | 6/2005 | Lin et al. |
| 6,917,469 B2 | 7/2005 | Momose |
| 6,930,816 B2 | 8/2005 | Mochizuki |
| 6,967,779 B2 | 11/2005 | Fadel |
| 6,982,820 B2 | 1/2006 | Tsai |
| 6,995,890 B2 | 2/2006 | Lin et al. |
| 6,999,225 B2 | 2/2006 | Lin et al. |
| 6,999,236 B2 | 2/2006 | Lin et al. |
| 7,002,726 B2 | 2/2006 | Patel et al. |
| 7,006,272 B2 | 2/2006 | Tsai |
| 7,009,754 B2 | 3/2006 | Huibers |
| 7,016,095 B2 | 3/2006 | Lin |
| 7,034,981 B2 | 4/2006 | Makigaki |
| 7,038,752 B2 | 5/2006 | Lin |
| 7,042,643 B2 | 5/2006 | Miles |
| 7,072,093 B2 | 7/2006 | Piehl et al. |
| 7,072,096 B2 | 7/2006 | Holman et al. |
| 7,110,158 B2 | 9/2006 | Miles |
| 7,113,339 B2 * | 9/2006 | Taguchi et al. ............. 359/586 |
| 7,123,216 B1 | 10/2006 | Miles |
| 7,126,738 B2 | 10/2006 | Miles |
| 7,138,984 B1 | 11/2006 | Miles |
| 7,142,347 B2 | 11/2006 | Islam |
| 7,161,728 B2 | 1/2007 | Sampsell et al. |
| 7,161,730 B2 | 1/2007 | Floyd |
| 7,172,915 B2 | 2/2007 | Lin et al. |
| 7,198,873 B2 | 4/2007 | Geh et al. |
| 7,218,429 B2 | 5/2007 | Batchko |
| 7,304,784 B2 | 12/2007 | Chui |
| 7,336,329 B2 | 2/2008 | Yoon |
| 7,342,705 B2 | 3/2008 | Chui |
| 7,372,449 B2 | 5/2008 | Kodama et al. |
| 7,483,197 B2 | 1/2009 | Miles |
| 7,489,428 B2 | 2/2009 | Sampsell |
| 2001/0003487 A1 | 6/2001 | Miles |
| 2001/0019380 A1 | 9/2001 | Ishihara |

| | | |
|---|---|---|
| 2001/0019479 A1 | 9/2001 | Koki |
| 2001/0049061 A1 | 12/2001 | Nakagaki et al. |
| 2001/0055208 A1 | 12/2001 | Koichi |
| 2002/0006044 A1 | 1/2002 | Harbers |
| 2002/0015215 A1 | 2/2002 | Miles |
| 2002/0024711 A1 | 2/2002 | Miles |
| 2002/0054424 A1 | 5/2002 | Miles |
| 2002/0075555 A1 | 6/2002 | Miles |
| 2002/0080465 A1 | 6/2002 | Han |
| 2002/0106182 A1 | 8/2002 | Kawashima |
| 2002/0126364 A1 | 9/2002 | Miles |
| 2002/0149584 A1 | 10/2002 | Simpson |
| 2002/0154215 A1 | 10/2002 | Schechterman |
| 2002/0191130 A1 | 12/2002 | Liang et al. |
| 2003/0011864 A1 | 1/2003 | Flanders |
| 2003/0043157 A1 | 3/2003 | Miles |
| 2003/0072070 A1 | 4/2003 | Miles |
| 2003/0083429 A1 | 5/2003 | Smith |
| 2003/0095401 A1 | 5/2003 | Hanson |
| 2003/0107692 A1 | 6/2003 | Sekiguchi |
| 2003/0151821 A1 | 8/2003 | Favalora et al. |
| 2003/0160919 A1 | 8/2003 | Yutaka et al. |
| 2003/0161040 A1 | 8/2003 | Ishii |
| 2003/0169385 A1 | 9/2003 | Okuwaki |
| 2003/0179383 A1 | 9/2003 | Chen et al. |
| 2003/0210363 A1 | 11/2003 | Yasukawa et al. |
| 2003/0214621 A1* | 11/2003 | Kim et al. .................. 349/155 |
| 2004/0017599 A1 | 1/2004 | Yang |
| 2004/0027315 A1 | 2/2004 | Senda et al. |
| 2004/0051929 A1 | 3/2004 | Sampsell et al. |
| 2004/0066477 A1* | 4/2004 | Morimoto et al. ........... 349/113 |
| 2004/0070711 A1 | 4/2004 | Wen et al. |
| 2004/0080807 A1 | 4/2004 | Chen et al. |
| 2004/0080938 A1 | 4/2004 | Holman et al. |
| 2004/0100594 A1 | 5/2004 | Huibers et al. |
| 2004/0114242 A1 | 6/2004 | Sharp |
| 2004/0115339 A1 | 6/2004 | Nobuyuki |
| 2004/0125048 A1 | 7/2004 | Toshihiro et al. |
| 2004/0125281 A1 | 7/2004 | Lin et al. |
| 2004/0125282 A1 | 7/2004 | Lin |
| 2004/0145811 A1 | 7/2004 | Lin et al. |
| 2004/0147198 A1 | 7/2004 | Lin |
| 2004/0174583 A1 | 9/2004 | Chen et al. |
| 2004/0207897 A1 | 10/2004 | Lin |
| 2004/0209192 A1 | 10/2004 | Lin |
| 2004/0209195 A1 | 10/2004 | Lin |
| 2004/0217919 A1 | 11/2004 | Piehl et al. |
| 2004/0218251 A1 | 11/2004 | Piehl et al. |
| 2004/0233357 A1 | 11/2004 | Fujimori |
| 2004/0233503 A1 | 11/2004 | Kimura |
| 2004/0240032 A1 | 12/2004 | Miles |
| 2005/0002082 A1 | 1/2005 | Miles |
| 2005/0010568 A1 | 1/2005 | Nagatomo |
| 2005/0024557 A1 | 2/2005 | Lin |
| 2005/0035699 A1 | 2/2005 | Tsai |
| 2005/0036095 A1 | 2/2005 | Yeh et al. |
| 2005/0036192 A1 | 2/2005 | Lin et al. |
| 2005/0042117 A1 | 2/2005 | Lin |
| 2005/0046948 A1 | 3/2005 | Lin |
| 2005/0057442 A1 | 3/2005 | Way |
| 2005/0068605 A1 | 3/2005 | Tsai |
| 2005/0068606 A1 | 3/2005 | Tsai |
| 2005/0069209 A1 | 3/2005 | Damera-Venkata et al. |
| 2005/0083352 A1 | 4/2005 | Higgins |
| 2005/0120553 A1 | 6/2005 | Brown |
| 2005/0168849 A1 | 8/2005 | Lin |
| 2005/0179977 A1 | 8/2005 | Chui et al. |
| 2005/0195462 A1 | 9/2005 | Lin |
| 2005/0253820 A1 | 11/2005 | Horiuchi |
| 2005/0286113 A1 | 12/2005 | Miles |
| 2006/0001942 A1 | 1/2006 | Chui |
| 2006/0002141 A1 | 1/2006 | Ouderkirk |
| 2006/0022966 A1 | 2/2006 | Mar |
| 2006/0028708 A1 | 2/2006 | Miles |
| 2006/0066541 A1 | 3/2006 | Gally et al. |
| 2006/0066557 A1 | 3/2006 | Floyd |
| 2006/0066586 A1 | 3/2006 | Gally et al. |
| 2006/0066641 A1 | 3/2006 | Gally et al. |
| 2006/0066935 A1 | 3/2006 | Cummings et al. |
| 2006/0067600 A1 | 3/2006 | Gally et al. |
| 2006/0067633 A1 | 3/2006 | Gally et al. |
| 2006/0067651 A1 | 3/2006 | Chui |
| 2006/0077122 A1 | 4/2006 | Gally et al. |
| 2006/0077124 A1 | 4/2006 | Gally et al. |
| 2006/0077125 A1 | 4/2006 | Floyd |
| 2006/0077127 A1 | 4/2006 | Sampsell |
| 2006/0077148 A1 | 4/2006 | Gally et al. |
| 2006/0077149 A1 | 4/2006 | Gally et al. |
| 2006/0091824 A1 | 5/2006 | Pate |
| 2006/0103912 A1 | 5/2006 | Katoh et al. |
| 2006/0109682 A1 | 5/2006 | Ko |
| 2006/0132383 A1 | 6/2006 | Gally et al. |
| 2006/0227532 A1 | 10/2006 | Ko |
| 2006/0250337 A1 | 11/2006 | Miles |
| 2006/0274243 A1 | 12/2006 | Iijima et al. |
| 2007/0031097 A1 | 2/2007 | Heikenfeld et al. |
| 2007/0031685 A1 | 2/2007 | Ko |
| 2007/0132843 A1 | 6/2007 | Miles |
| 2007/0201234 A1 | 8/2007 | Ottermann |
| 2007/0247704 A1 | 10/2007 | Mignard |
| 2007/0253054 A1 | 11/2007 | Miles |
| 2008/0112031 A1 | 5/2008 | Gally |
| 2008/0112039 A1 | 5/2008 | Chui |
| 2008/0151347 A1 | 6/2008 | Chui |
| 2009/0086301 A1 | 4/2009 | Gally |

FOREIGN PATENT DOCUMENTS

| | | |
|---|---|---|
| CN | 1286424 | 3/2001 |
| CN | 1381752 A | 11/2002 |
| CN | 1409157 A | 4/2003 |
| DE | 196 22 748 | 12/1997 |
| EP | 0 366 117 | 5/1990 |
| EP | 0 389 031 | 9/1990 |
| EP | 0 590 511 | 4/1994 |
| EP | 0 667 548 | 8/1995 |
| EP | 0 695 959 | 2/1996 |
| EP | 0 786 911 | 7/1997 |
| EP | 0 822 441 | 2/1998 |
| EP | 0 830 032 | 3/1998 |
| EP | 0 855 745 | 7/1998 |
| EP | 1 003 062 | 5/2000 |
| EP | 1 014 161 | 6/2000 |
| EP | 1 081 633 | 3/2001 |
| EP | 1 089 115 | 4/2001 |
| EP | 1 251 454 | 4/2002 |
| EP | 1 205 782 | 5/2002 |
| EP | 1 271 223 | 6/2002 |
| EP | 1298635 | 4/2003 |
| EP | 1 336 876 | 8/2003 |
| EP | 1 341 025 | 9/2003 |
| EP | 1 389 775 | 2/2004 |
| EP | 1 413 543 | 4/2004 |
| EP | 1 450 418 | 8/2004 |
| EP | 1 640 779 | 3/2006 |
| EP | 1640761 | 3/2006 |
| EP | 1640313 | 3/2007 |
| EP | 1767981 | 3/2007 |
| FR | 2760559 | 9/1998 |
| GB | 22 78 222 | 11/1994 |
| GB | 2321532 | 7/1998 |
| JP | 02-068513 | 3/1990 |
| JP | 04-081816 | 3/1992 |
| JP | 05-281479 | 10/1993 |
| JP | 08-18990 | 1/1996 |
| JP | 08018990 A2 | 1/1996 |

| | | |
|---|---|---|
| JP | 09-189869 | 7/1997 |
| JP | 09 189869 | 7/1997 |
| JP | 09281917 A | 10/1997 |
| JP | 11 174234 | 7/1999 |
| JP | 11174234 A | 7/1999 |
| JP | 11-211999 | 8/1999 |
| JP | 2000 075293 | 3/2000 |
| JP | 2000 193933 | 7/2000 |
| JP | 2000 514568 | 10/2000 |
| JP | 2001 343514 | 12/2001 |
| JP | 2001/343514 A | 12/2001 |
| JP | 2002-062505 | 2/2002 |
| JP | 2002 062505 | 2/2002 |
| JP | 2002-174780 | 6/2002 |
| JP | 2002-245835 | 8/2002 |
| JP | 2002 245835 | 8/2002 |
| JP | 2002-287047 | 10/2002 |
| JP | 2003-315694 | 11/2003 |
| JP | 2003 315694 | 11/2003 |
| JP | 2003-315732 | 11/2003 |
| JP | 2004-212673 | 7/2004 |
| JP | 2004-212922 | 7/2004 |
| JP | 2004-206049 | 10/2004 |
| KR | 2002/010322 | 2/2002 |
| TW | ROC 594155 | 6/2004 |
| WO | WO 95/30924 | 11/1995 |
| WO | WO 96/08833 | 3/1996 |
| WO | WO 97/17628 | 5/1997 |
| WO | WO 99/52006 A2 | 10/1999 |
| WO | WO 99/63394 | 12/1999 |
| WO | WO 01/81994 | 11/2001 |
| WO | WO 01/84228 | 11/2001 |
| WO | WO 02/024570 A1 | 3/2002 |
| WO | WO 02/071132 A2 | 9/2002 |
| WO | WO 03/007049 | 1/2003 |
| WO | WO 03/032058 | 4/2003 |
| WO | WO 03/056876 | 7/2003 |
| WO | WO 03/073151 | 9/2003 |
| WO | WO 03/075207 | 9/2003 |
| WO | WO 2004/006003 | 1/2004 |
| WO | WO 2004/068460 | 8/2004 |
| WO | WO 2005/011012 | 2/2005 |
| WO | WO 2005/088367 | 9/2005 |
| WO | WO 2006/036421 | 4/2006 |
| WO | WO 2006/36440 | 4/2006 |
| WO | WO 2006/036524 | 4/2006 |
| WO | WO 2006/036540 | 4/2006 |
| WO | WO 2006/36559 | 4/2006 |
| WO | WO 2007/127046 | 11/2007 |
| WO | WO 2008/045311 | 4/2008 |

OTHER PUBLICATIONS

Extended European Search Report, Dec. 7, 2005, European Patent Office.
Office Communication from the USPTO for U.S. Appl. No. 11/036,965 dated Sep. 18, 2006.
Amendment in Reply to Office Communication from the USPTO for U.S. Appl. No. 11/036,965 dated Oct. 17, 2006.
Official Communication from European Patent Office for European Application No. EP 05255657 dated Dec. 10, 2006.
ISR and WO for European Application No. EP 05255657 filed Sep. 14, 2005 [in back of publication].
Extended European Search Report for European Application No. 05255638.8 dated May 4, 2006.
Official Communication from the European Patent Office for European Application No. 05255638.8 dated Jan. 5, 2007.
ISR and WO for International Application No. PCT/US2005/032886 filed Sep. 14, 2005.
Office Communication from the USPTO for U.S. Appl. No. 11/408,753 dated Dec. 22, 2006.
Amendment in Reply to Office Communication from the USPTO for U.S. Appl. No. 11/408,753 dated Apr. 18, 2007.
Office Communication from the USPTO for U.S. Appl. No. 11/408,753 dated Jul. 3, 2007.
ISR and WO for International Application No. PCT/US2005/002986 filed Feb. 2, 2005.
Office Communication from the USPTO for U.S. Appl. No. 11/036,965 dated Mar. 28, 2006.
Amendment in Reply to Office Communication from the USPTO for U.S. Appl. No. 11/036,965 dated Jun. 27, 2006.
Office Communication from the USPTO for U.S. Appl. No. 11/036,965 dated Jan. 30, 2007.
Amendment in Reply to Office Communication from the USPTO for U.S. Appl. No. 11/036,965 dated Jun. 29, 2007.
Notice of Allowance from the USPTO for U.S. Appl. No. 11/036,965 dated Sep. 11, 2007.
ISR and WO for International Application No. PCT/US2005/032335 filed Sep. 9, 2005.
Extended European Search Report for European Application No. 05255646.1 dated Feb. 6, 2007.
Office Communication from the USPTO for U.S. Appl. No. 10/249,244 dated Sep. 29, 2004.
Amendment in Reply to Office Communication from the USPTO for U.S. Appl. No. 10/249,244 dated Nov. 15, 2004.
Notice of Allowance from the USPTO for U.S. Appl. No. 10/249,244 dated Jan. 26, 2005.
Translation of the Official Communication Received from the Japanese Patent Office for Application No. 2003-136787 dated Nov. 14, 2006.
Aratani, et al., "Process and Design Considerations for Surface Micromachined Beams for a Tuneable Interferometer Array in Silicon," Proc. IEEE Microelectromechanical Workshop, Fort Lauderdale, FL, pp. 230-235 (Feb. 1993).
Aratani, et. al., "Surface micromachined tuneable interferometer array", Sensors and Actuators A, vol. A43, No. 1/3, May 1, 1994, pp. 17-23.
Conner, "Hybrid Color Display Using Optical Interference Filter Array," SID Digest, pp. 577-580 (1993).
Fan, et al., "Channel Drop Filters in Photonic Crystals", Optics Express, vol. 3, No. 1, 1998.
Giles, et al., "Silicon MEMS Optical Switch Attenuator and Its Use in Lightwave Subsystems", IEEE Journal of Selected Topics in Quanum Electronics, vol. 5, No. 1, Jan./Feb. 1999,pp. 18-25.
Goossen, et al., "Silicon Modulator Based on Mechanically-Active Anti-Reflection Layer with 1Mbit/sec Capability for Fiber-in-the-Loop Applications," IEEE Photonics Technology Letters, pp. 1119, 1121 (Sep. 1994).
Huang, et al., "Multidirectional Asymmetrical Microlens-Array Light Control Films for High Performance Reflective Liquid Crystal Displays", SID Digest, 2002, pp. 870-873.
Jerman, et al., "A Miniature Fabry-Perot Interferometer Fabricated Using Silicon Micromaching Techniques," IEEE Electron Devices Society (1998).
Jerman, et al., "A Miniature Fabry-Perot Interferometer with a Corrugated Silicon Diaphragm Support", (1988).
Little, et al., "Vertically Coupled Microring Rosonator Channel Dropping Filter", IEEE Photonics Technology Letters, vol. 11, No. 2, 1999.
Magel, "Integrated Optic Devices Using Micromachined Metal Membranes", SPIE vol. 2686, 0-8194-2060-3/1996.
Mehregany, et al., "MEMS Applications in Optical Systems", IEEE/LEOS 1996 Summer Topical Meetings, pp. 76-76, (Aug. 5-9, 1996).
Miles, et al., Digital Paper for reflective displays, Journal of the Society for Information Display, San Jose, CA, vol. 11, No. 1, 2003, pp. 209-215.
Miles, Interferometric Modulation: MOEMS as an enabling technology for high-performance reflective displays, Proceedings of the SPIE, 4985:28, pp. 131-139, Jan. 2003.
Miles, "A New Reflective FPD Technology Using Interferometric Modulation", The Proceedings of the Society for Information Display (May 11-16, 1997).
Miles, MW "A MEMS Based Interferometric Modulator (IMOD) for Display Applications" Proceedings of Sensors Expo, Oct. 21, 1997 © 1997 Helmer's Publishing, Inc., pp. 281-284.

Raley, et al., "A Fabry-Perot Microinterferometer for Visible Wavelengths," IEEE Solid-State Sensor and Actuator Workshop, Hilton Head, SC, pp. 170-173 (1992).

Sperger, et al., "High Performance Patterned All-Dielectric Interference Colour Filter for Display Applications", SID Digest, pp. 81-83, (1994).

Walker, et al., "Electron-beam-tuneable Interference Filter Spatial Light Modulator", Optics Letters vol. 13, No. 5, pp. 345-347, (May 1988).

"CIE Color System," from website hyperphysics.phy-astr.gsu.edu. hbase/vision/cie.html, (Cited in Notice of Allowance mailed Jan. 11, 2008 in U.S. Appl. No. 11/188,197; Examiner stated that no date was available. However the citation was available on internet prior to Dec. 30, 2007).

Hohlfeld,.et. al., "Micro-machined tunable optical filters with optimized band-pass spectrum", $12^{th}$ International Conference on Transducers, Solid State Sensors, Actuators and Microsystems, vol. 2, Jun. 8-12, 2003, pp. 1494-1497.

Manzardo, et al., "Optics and Actuators for Miniaturized Spectrometers," International Conference on Optical MEMS, 12(6):23-24 (Dec. 2003).

Wu, "Design of a Reflective Color LCD Using Optical Interference Reflectors", ASIA Display '95, pp. 929-931, (Oct. 1995).

ISR and WO dated Jan. 10, 2006 in International Application No. PCT/US2005/030968, (International Publication No. WO 2006/36440).

ISR and WO dated Dec. 30, 2005 in International Application No. PCT/US2005/030526, (International Publication No. WO 2006/036421).

European Search Report dated Jan. 19, 2006 in European Application No. 05 25 56 35 (European Publication No. EP 1640761).

European Search Report dated Jan. 4, 2006 in European Application No. 05 25 56 36.

Partial European Search Report dated Feb. 22, 2007 in European Application No. 06 07 7032 (European Publication No. EP 1767981).

Extended European Search Report in European Application No. 06 07 7032 dated May 5, 2007 (European Publication No. EP 1767981).

ISR and WO dated Jan. 10, 2006 in International Application No. PCT/US2005/032773, (International Publication No. WO 2006/36559).

Amendment and Response to Office Action dated Jul. 3, 2007, dated Jan. 2, 2008 in U.S. Appl. No. 11/408,753.

Office Action dated Mar. 20, 2008 in U.S. Appl. No. 11/408,753.

ISR and WO dated Nov. 2, 2007 in International Application No. PCT/US07/08790, (International Publication No. WO 2007/127046).

ISR and WO dated Feb. 6, 2006 in International Application No. PCT/US2005/032633, (Publication No. WO 2006/036540).

ISR and WO dated Jan. 11, 2006 in International Application No. PCT/US2005/032426, (Publication No. WO 2006/036524).

Austrian Search Report in U.S. Appl. No. 11/051,258 mailed May 13, 2005.

Austrian Search Report in U.S. Appl. No. 11/036,965 mailed Jul. 25, 2005.

Austrian Search Report in U.S. Appl. No. 11/064,143 mailed Aug. 12, 2005.

Austrian Search Report in U.S. Appl. No. 11/077,974 mailed Jul. 14, 2005.

Austrian Search Report in U.S. Appl. No. 11/118,605 mailed Jul. 14, 2005.

Austrian Search Report in U.S. Appl. No. 11/118,110 mailed Aug. 12, 2005.

Austrian Search Report in U.S. Appl. No. 11/083,841 mailed Jul. 14, 2005.

Austrian Search Report in U.S. Appl. No. 11/140,561 mailed Jul. 12, 2005.

Official Communication from the Mexican Patent Office in Mexican Patent Application No. PA/a/2005/010248 dated Apr. 24, 2008.

Official Communication from the Mexican Patent Office in Mexican Patent Application No. PA/a/2005/008406 dated May 19, 2008.

Official Communication from the State Intellectual Property Office in Chinese Application No. 200510105055 dated Jul. 4, 2008.

Official Communication from the European Patent Office in European Application No. 05 255 638.8 dated Aug. 21, 2008.

Official Communication from the State Intellectual Property Office in Chinese Application No. 200510103557.9 dated May 9, 2008.

Amendment and Response to Office Action in U.S. Appl. No. 11/408,753 dated Jun. 20, 2008.

Official Communication in Japanese Patent App. No. 2005-235802 dated Sep. 9, 2008.

Official Communication from the USPTO in U.S. Appl. No. 12/034,499 dated Jul. 9, 2008.

Official Communication from the USPTO in U.S. Appl. No. 12/014,657 dated Aug. 21, 2008.

Official Communication in Chinese Application No. 2005800038120 dated Mar. 7, 2008.

Official Communication in Japanese Application No. 2005-265709 dated Oct. 21, 2008.

Official Communication from the USPTO in U.S. Appl. No. 11/077,974 dated Oct. 3, 2008.

Official Communication in Chinese Application No. 2005101050511 dated Mar. 28, 2008.

Official Communication in Chinese Application No. 2005101050511 dated Dec. 19, 2008.

Official Communication in Japanese Application No. 2005-260607 dated Sep. 30, 2008.

Amendment and Response dated Jun. 20, 2008 in U.S. Appl. No. 11/408,753.

Notice of Allowance dated Sep. 16, 2008 in U.S. Appl. No. 11/408,753.

RCE dated Dec. 15, 2008 in U.S. Appl. No. 11/408,753.

Notice of Allowance dated Jan. 9, 2009 in U.S. Appl. No. 11/408,753.

Official Communication in U.S. Appl. No. 11/208,085 dated Dec. 10, 2008.

Official Communication in Japanese Patent App. No. 2003-136787 dated Nov. 7, 2006.

Petschick et al. "Fabry-Perot-Interferometer", May 14 2002, available at http://pl.physik.tu-berlin.berlin.de/groups/pg279/protokolless02/04_fpi.pdf.

Extended European Search Report in European App. No. 05255714.7 (Publication No. EP 1 640 779) dated Apr. 14, 2009.

Amendment and Response in U.S. Appl. No. 11/077,974 dated Feb. 2, 2009.

Official Communication in U.S. Appl. No. 11/077,974 dated May 8, 2009.

Official Communication in European App. No. 05 255 646.1 dated Apr. 27, 2009.

Amendment and Response in U.S. Appl. No. 12/034,499 dated Oct. 8, 2008.

Official Communication in U.S. Appl. No. 12/034,499 dated Jan. 26, 2009.

RCE and Amendment in U.S. Appl. No. 12/034,499 dated Apr. 27, 2009.

Amendment and Response in U.S. Appl. No. 12/014,657 dated Nov. 21, 2008.

Official Communication in U.S. Appl. No. 12/014,657 dated Mar. 5, 2009.

RCE in U.S. Appl. No. 11/408,753 dated Apr. 7, 2009.

Notice of Allowance in U.S. Appl. No. 11/408,753 dated Apr. 24, 2009.

Official Communication in Chinese App. No. 200510105055 dated Mar. 13, 2009.

Official Communication in Japanese App. No. 2005-265709 dated Mar. 5, 2009.

Mark W. Miles, "MEMS-based lnterferometric Modulator for Display Applications," Proceedings of SPIE Micromachined Devices and Components. V(1999) p. 20-28.

Mark W. Miles, "Interferometric Modulation: A MEMS Based Technology for the Modulation of Light," Final Program and Proceedings IS &T's 50th Annual Conference (1997) p. 674-677.

Mark W. Miles, "A New Reflective FPD Technology Using interfermotric modulation" Journal of the Society or Information Display vol. 5 No. 4 (1997) p. 379-382.

Neal T.D., et. al., "Surface Plasmon enhanced emission from dye doped polymer layers," Optics Express Opt. Soc. America, USA, vol. 13, No. 14, Jul. 11, 2005.
International Search Report and Written Opinion in PCT/US2007/021376 (International Publication No. WO 2008/045311) dated Jun. 18, 2008.
Amendment in U.S. Appl. No. 12/014,657 dated Jun. 5, 2009.
Official Communication in U.S. Appl. No. 11/064,143 dated Jun. 26, 2009.
Amendment and Response in U.S. Appl. No. 11/208,085 dated Jun. 8, 2009.
Official Communication in Taiwan App. No. 09410330 dated Aug. 16, 2006.
Official Communication in Russian App. No. 2006131568/28(o34325) dated Feb. 17, 2009.
Decision of Rejection in Japanese App. No. 2005 235802 dated Nov. 19, 2009.
Office Action in U.S. Appl. No. 12/014,657 dated Oct. 15, 2009.
Office Action in U.S. Appl. No. 12/034,499 dated Jul. 16, 2009.
Interview Summary in U.S. Appl. No. 12/034,499 dated Oct. 29, 2009.
Communication from the Japanese Patent Office in Japanese App. No. 2006-552191 dated Sep. 8, 2009.
Amendment in U.S. Appl. No. 11/077,974 dated Aug. 10, 2009.
Advisory Action in U.S. Appl. No. 11/077,974 dated Aug. 31, 2009.
RCE and Amendment in U.S. Appl. No. 11/077,974 dated Sep. 8, 2009.
Interview Summary in U.S. Appl. No. 11/077,974 dated Sep. 30, 2009.
Office Action in U.S. Appl. No. 11/077,974 dated Nov. 23, 2009.
Amendment and Response in U.S. Appl. No. 11/064,143 dated Sep. 25, 2009.
Communication from the Japanese Patent Office in Japanese App. No. 2005-265709 dated Jun. 30, 2009.
Notice of Allowance in U.S. Appl. No. 11/208,085 dated Sep. 14, 2009.
RCE and IDS in U.S. Appl. No. 11/208,085 dated Nov. 13, 2009,
RCE in U.S. Appl. No. 11/408,753 dated Jul. 21, 2009.
Preliminary Amendment in U.S. Appl. No. 11/408,753 dated Jul. 31, 2009.
Notice of Allowance in U.S. Appl. No. 11/408,753 dated Aug. 3, 2009.
Supplementary Notice of Allowability in U.S. Appl. No. 11/408,753 dated Sep. 3, 2009.
Interview Summary in U.S. Appl. No. 11/408,753 dated Sep. 10, 2009.
Amendment under 37 CFR 1.312 in U.S. Appl. No. 11/408,753 dated Oct. 2, 2009.
Response to Amendment under 37 CFR 1.312 in U.S. Appl. No. 11/408,753 dated Oct. 8, 2009.
RCE and IDS in U.S. Appl. No. 11/408,753 dated Nov. 2, 2009.
Preliminary Amendment in U.S. Appl No. 11/408,753 dated Nov. 6, 2009.
Notice of Allowance in U.S. Appl. No. 11/408,753 dated Nov. 6, 2009.
Interview Summary in U.S. Appl. No. 11/408,753 dated Nov. 19, 2009.

* cited by examiner

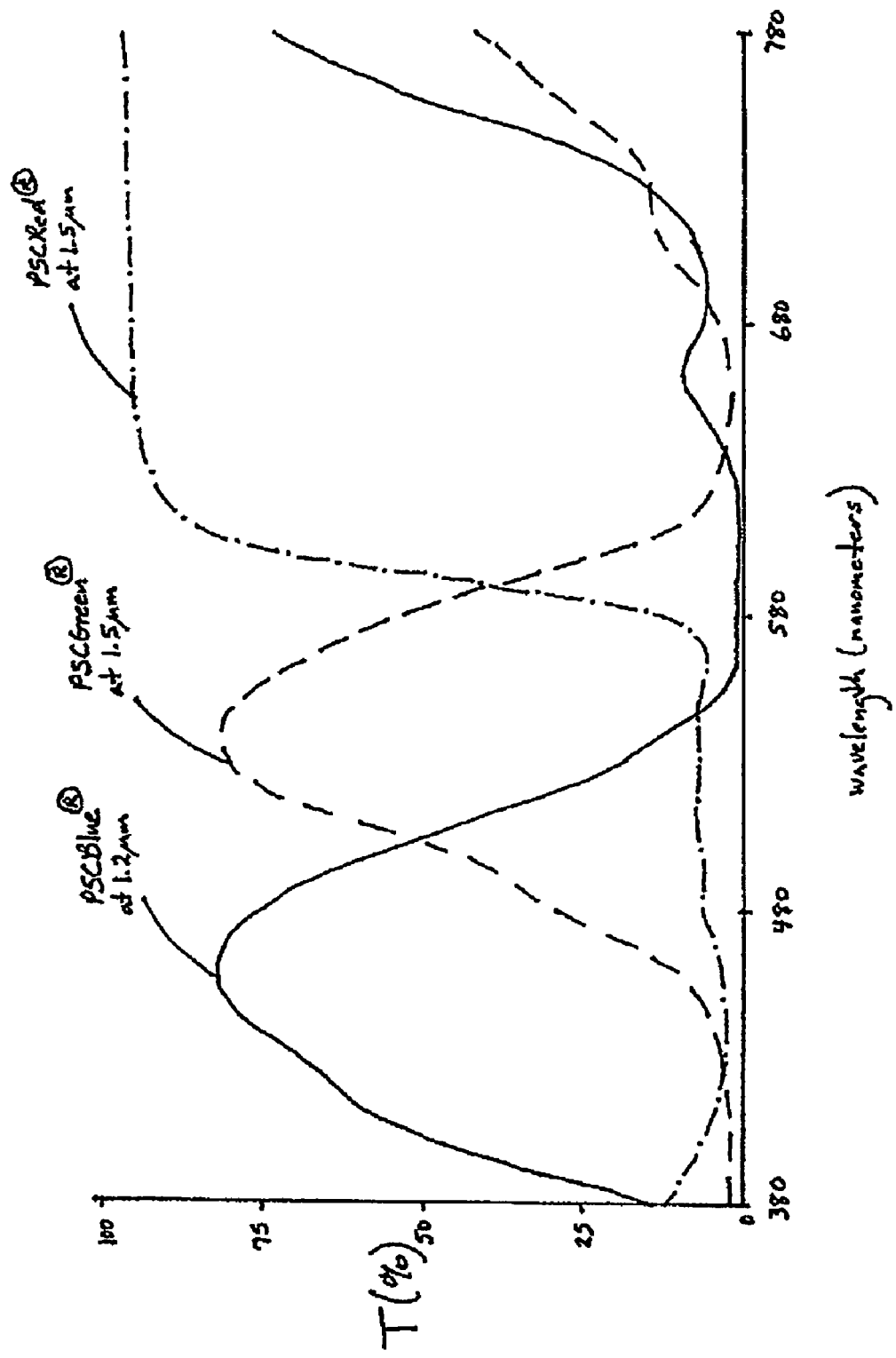

DISPLAY DEVICE HAVING AN ARRAY OF SPATIAL LIGHT MODULATORS WITH INTEGRATED COLOR FILTERS

CROSS-REFERENCE TO RELATED APPLICATIONS

This application claims priority under 35 U.S.C. § 119(e) to U.S. Provisional Application Ser. Nos. 60/613,542 and 60/613,491, both filed on Sep. 27, 2004, and U.S. Provisional Application Ser. No. 60/623,072, filed on Oct. 28, 2004, each of which are hereby expressly incorporated by reference in their entireties.

BACKGROUND

1. Field of the Invention

The field of the invention relates to microelectromechanical systems (MEMS), and, more particularly to interferometric modulators.

2. Description of the Related Technology

Microelectromechanical systems (MEMS) include micro mechanical elements, actuators, and electronics. Micromechanical elements may be created using deposition, etching, and or other micromachining processes that etch away parts of substrates and/or deposited material layers or that add layers to form electrical and electromechanical devices. One type of MEMS device is called an interferometric modulator. An interferometric modulator may comprise a pair of conductive plates, one or both of which may be transparent and/or reflective in whole or part and capable of relative motion upon application of an appropriate electrical signal. One plate may comprise a stationary layer deposited on a substrate, the other plate may comprise a metallic membrane separated from the stationary layer by an air gap. Such devices have a wide range of applications, and it would be beneficial in the art to utilize and/or modify the characteristics of these types of devices so that their features can be exploited in improving existing products and creating new products that have not yet been developed.

SUMMARY OF CERTAIN EMBODIMENTS

The system, method, and devices of the invention each have several aspects, no single one of which is solely responsible for its desirable attributes. Without limiting the scope of this invention, its more prominent features will now be discussed briefly. After considering this discussion, and particularly after reading the section entitled "Detailed Description of Certain Embodiments" one will understand how the features of this invention provide advantages over other display devices.

Certain embodiments of the invention provide a display device comprising an array of spatial light modulators. Each spatial light modulator is individually addressable so as to be switched between a first state in which the modulator is substantially reflective to at least one wavelength of light and a second state in which the modulator is substantially non-reflective to the at least one wavelength of light. The display device further comprises an array of color filters. Each color filter is positioned such that light reflected from a corresponding spatial light modulator propagates through the color filter. Each color filter substantially transmits the at least one wavelength of a corresponding spatial light modulator.

In certain embodiments, the spatial light modulator comprises an interferometric modulator which comprises a fixed surface and a movable surface substantially parallel to the fixed surface. In the first state, the movable surface is spaced a first distance from the fixed surface in a direction substantially perpendicular to the fixed surface. In the second state, the moveable surface is spaced a second distance, different from the first distance, from the fixed surface in a direction substantially perpendicular to the fixed surface. In certain embodiments, either the first distance or the second distance is approximately zero. In certain embodiments, the first distance for each of the spatial light modulators is approximately the same. In certain embodiments, the second distance for each of the spatial light modulators is approximately the same. In certain embodiments, the array of spatial light modulators comprises two or more subsets of spatial light modulators, with the modulators of each subset each having the same first distance and the same second distance.

In certain embodiments, the at least one wavelength of a spatial light modulator comprises a broadband wavelength region (e.g., white light). In certain embodiments, the at least one wavelength of a spatial light modulator comprises a narrowband wavelength region comprising two or more colors. In certain embodiments, the at least one wavelength of a spatial light modulator comprises a single color of light (e.g., red, green, or blue light). In certain embodiments, the at least one wavelength comprises first-order light, while in other embodiments, the at least one wavelength comprises second-, third-, fourth-, or fifth-order light.

Other embodiments are possible. For example, in other embodiments, other types of light-modulating elements other than interferometric modulators (e.g., other types of MEMS or non-MEMs, reflective or non-reflective structures) may be used.

BRIEF DESCRIPTION OF THE DRAWINGS

FIG. 12 is a graph of transmittance spectra for a set of three exemplary color filter materials compatible with embodiments described herein.

DETAILED DESCRIPTION OF CERTAIN EMBODIMENTS

By selectively placing color filters with different transmittance spectrums on an array of modulator elements each having the same reflectance spectrum, a resultant reflectance spectrum for each modulator element and it's respective color filter is created. In one embodiment, the modulator elements in an array are manufactured by the same process so that each modulator element has a reflectance spectrum that includes multiple reflectivity lines. Color filters corresponding to multiple colors, such as red, green, and blue, for example, may be selectively associated with these modulator elements in order to filter out a desired wavelength range for each modulator element and provide a multiple color array. Because the modulator elements are manufactured by the same process, each of the modulator elements is substantially the same and common voltage levels may be used to activate and deactivate selected modulation.

The following detailed description is directed to certain specific embodiments of the invention. However, the invention can be embodied in a multitude of different ways. In this description, reference is made to the drawings wherein like parts are designated with like numerals throughout. As will be apparent from the following description, the invention may be implemented in any device that is configured to display an image, whether in motion (e.g., video) or stationary (e.g., still image), and whether textual or pictorial. More particularly, it is contemplated that the invention may be implemented in or associated with a variety of electronic devices such as, but not limited to, mobile telephones, wireless devices, personal data assistants (PDAs), hand-held or portable computers, GPS receivers/navigators, cameras, MP3 players, camcorders, game consoles, wrist watches, clocks, calculators, television monitors, flat panel displays, computer monitors, auto displays (e.g., odometer display, etc.), cockpit controls and/or displays, display of camera views (e.g., display of a rear view camera in a vehicle), electronic photographs, electronic billboards or signs, projectors, architectural structures, packaging, and aesthetic structures (e.g., display of images on a piece of jewelry). MEMS devices of similar structure to those described herein can also be used in non-display applications such as in electronic switching devices.

Figure 1:
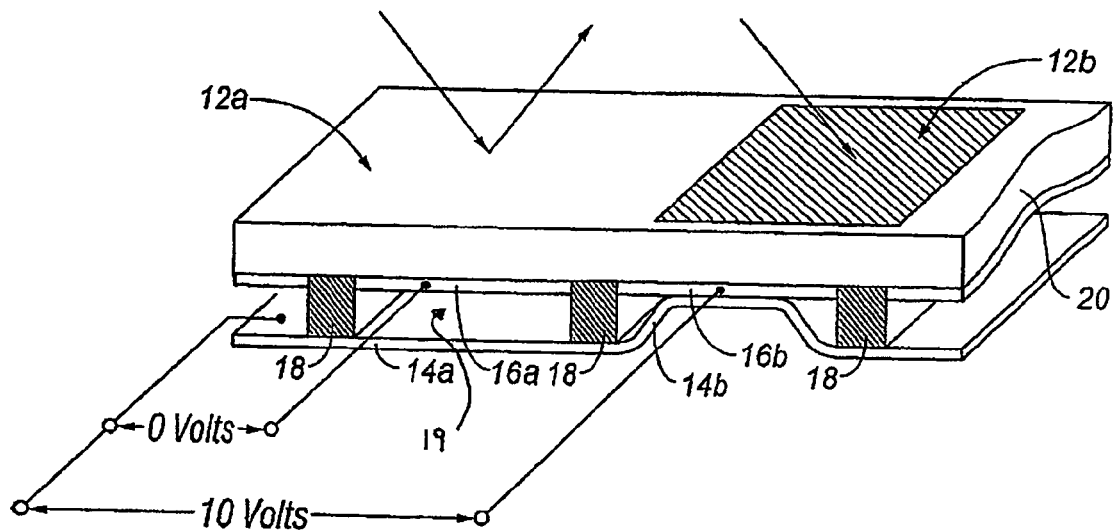
FIG. 1 is an isometric view depicting a portion of one embodiment of an interferometric modulator display in which a movable reflective layer of a first interferometric modulator is in a released position and a movable reflective layer of a second interferometric modulator is in an actuated position.

One interferometric modulator display embodiment comprising an interferometric MEMS display element is illustrated in FIG. 1. In these devices, the pixels are in either a bright or dark state. In the bright ("on" or "open") state, the display element reflects a large portion of incident visible light to a user. When in the dark ("off" or "closed") state, the display element reflects little incident visible light to the user. Depending on the embodiment, the light reflectance properties of the "on" and "off" states may be reversed. MEMS pixels can be configured to reflect predominantly at selected colors, allowing for a color display in addition to black and white.

FIG. 1 is an isometric view depicting two adjacent pixels in a series of pixels of a visual display, wherein each pixel comprises a MEMS interferometric modulator. In some embodiments, an interferometric modulator display comprises a row/column array of these interferometric modulators. Each interferometric modulator includes a pair of reflective layers positioned at a variable and controllable distance from each other to form a resonant optical cavity with at least one variable dimension. In one embodiment, one of the reflective layers may be moved between two positions. In the first position, referred to herein as the released state, the movable layer is positioned at a relatively large distance from a fixed partially reflective layer. In the second position, the movable layer is positioned more closely adjacent to the partially reflective layer. Incident light that reflects from the two layers interferes constructively or destructively depending on the position of the movable reflective layer, producing either an overall reflective or non-reflective state for each pixel.

The depicted portion of the pixel array in FIG. 1 includes two adjacent interferometric modulators 12a and 12b. In the interferometric modulator 12a on the left, a movable and highly reflective layer 14a is illustrated in a released position at a predetermined distance from a fixed partially reflective layer 16a. In the interferometric modulator 12b on the right, the movable highly reflective layer 14b is illustrated in an actuated position adjacent to the fixed partially reflective layer 16b.

The fixed layers 16a, 16b are electrically conductive, partially transparent and partially reflective, and may be fabricated, for example, by depositing one or more layers each of chromium and indium-tin-oxide onto a transparent substrate 20. The layers are patterned into parallel strips, and may form row electrodes in a display device as described further below. The movable layers 14a, 14b may be formed as a series of parallel strips of a deposited metal layer or layers (orthogonal to the row electrodes 16a, 16b) deposited on top of posts 18 and an intervening sacrificial material deposited between the posts 18. When the sacrificial material is etched away, the deformable metal layers are separated from the fixed metal layers by a defined air gap 19. A highly conductive and reflective material such as aluminum may be used for the deformable layers, and these strips may form column electrodes in a display device.

With no applied voltage, the cavity 19 remains between the layers 14a, 16a and the deformable layer is in a mechanically relaxed state as illustrated by the pixel 12a in FIG. 1. However, when a potential difference is applied to a selected row and column, the capacitor formed at the intersection of the row and column electrodes at the corresponding pixel becomes charged, and electrostatic forces pull the electrodes together. If the voltage is high enough, the movable layer is deformed and is forced against the fixed layer (a dielectric material which is not illustrated in this Figure may be deposited on the fixed layer to prevent shorting and control the separation distance) as illustrated by the pixel 12*b* on the right in FIG. 1. The behavior is the same regardless of the polarity of the applied potential difference. In this way, row/column actuation that can control the reflective vs. non-reflective pixel states is analogous in many ways to that used in conventional LCD and other display technologies.

Figure 2:
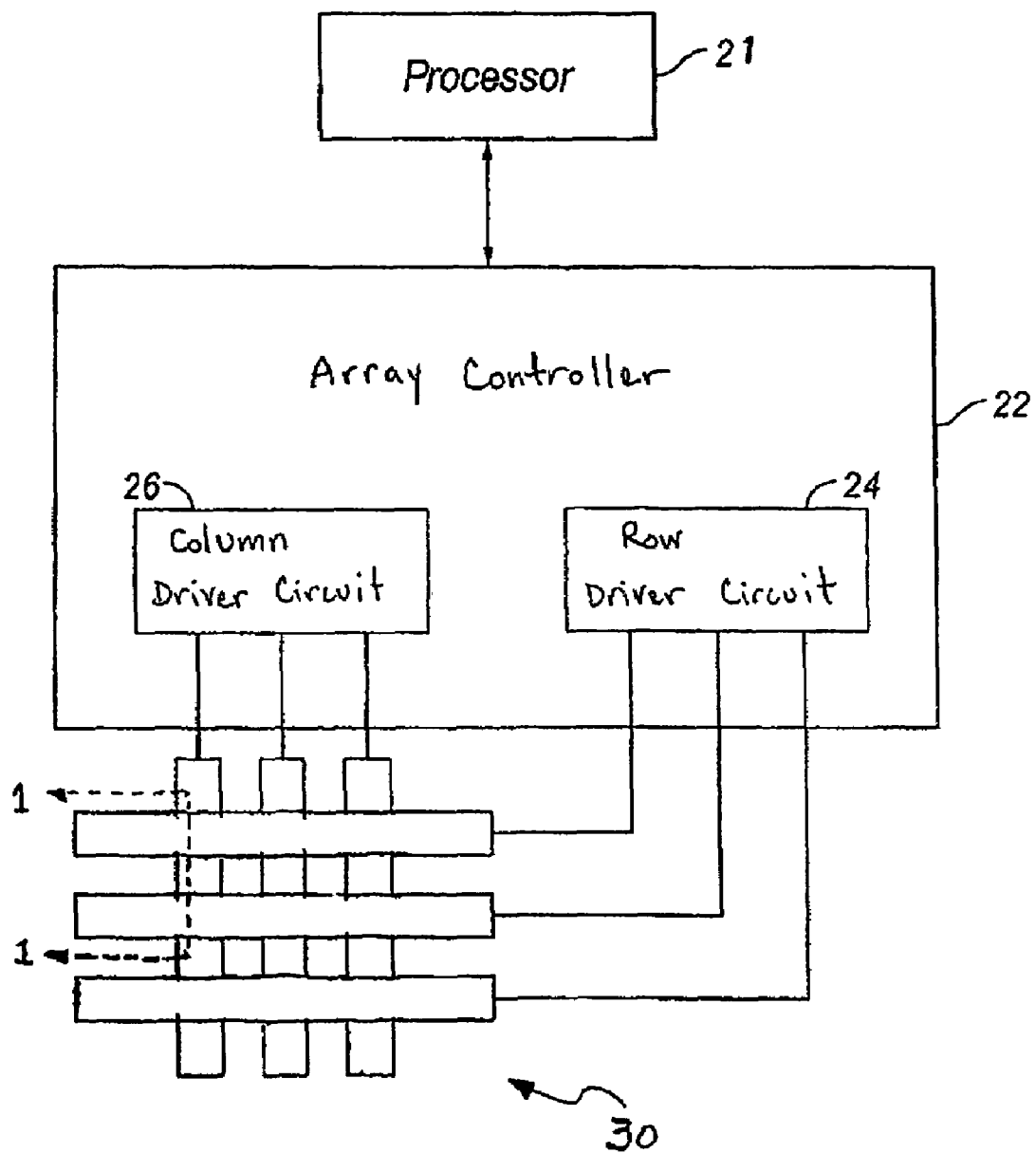
FIG. 2 is a system block diagram illustrating one embodiment of an electronic device incorporating a 3×3 interferometric modulator display.

FIGS. 2 through 5 illustrate one exemplary process and system for using an array of interferometric modulators in a display application. FIG. 2 is a system block diagram illustrating one embodiment of an electronic device that may incorporate aspects of the invention. In the exemplary embodiment, the electronic device includes a processor 21 which may be any general purpose single- or multi-chip microprocessor such as an ARM, Pentium®, Pentium II®, Pentium III®, Pentium IV®, Pentium® Pro, an 8051, a MIPS®, a Power PC®, an ALPHA®, or any special purpose microprocessor such as a digital signal processor, microcontroller, or a programmable gate array. As is conventional in the art, the processor 21 may be configured to execute one or more software modules. In addition to executing an operating system, the processor may be configured to execute one or more software applications, including a web browser, a telephone application, an email program, or any other software application.

In one embodiment, the processor 21 is also configured to communicate with an array controller 22. In one embodiment, the array controller 22 includes a row driver circuit 24 and a column driver circuit 26 that provide signals to a pixel array 30. The cross section of the array illustrated in FIG. 1 is shown by the lines 1-1 in FIG. 2. For MEMS interferometric modulators, the row/column actuation protocol may take advantage of a hysteresis property of these devices illustrated in FIG. 3. It may require, for example, a 10 volt potential difference to cause a movable layer to deform from the released state to the actuated state. However, when the voltage is reduced from that value, the movable layer maintains its state as the voltage drops back below 10 volts. In the exemplary embodiment of FIG. 3, the movable layer does not release completely until the voltage drops below 2 volts. There is thus a range of voltage, about 3 to 7 V in the example illustrated in FIG. 3, where there exists a window of applied voltage within which the device is stable in either the released or actuated state. This is referred to herein as the "hysteresis window" or "stability window." For a display array having the hysteresis characteristics of FIG. 3, the row/column actuation protocol can be designed such that during row strobing, pixels in the strobed row that are to be actuated are exposed to a voltage difference of about 10 volts, and pixels that are to be released are exposed to a voltage difference of close to zero volts. After the strobe, the pixels are exposed to a steady state voltage difference of about 5 volts such that they remain in whatever state the row strobe put them in. After being written, each pixel sees a potential difference within the "stability window" of 3-7 volts in this example. This feature makes the pixel design illustrated in FIG. 1 stable under the same applied voltage conditions in either an actuated or released pre-existing state. Since each pixel of the interferometric modulator, whether in the actuated or released state, is essentially a capacitor formed by the fixed and moving reflective layers, this stable state can be held at a voltage within the hysteresis window with almost no power dissipation. Essentially no current flows into the pixel if the applied potential is fixed.

In typical applications, a display frame may be created by asserting the set of column electrodes in accordance with the desired set of actuated pixels in the first row. A row pulse is then applied to the row 1 electrode, actuating the pixels corresponding to the asserted column lines. The asserted set of column electrodes is then changed to correspond to the desired set of actuated pixels in the second row. A pulse is then applied to the row 2 electrode, actuating the appropriate pixels in row 2 in accordance with the asserted column electrodes. The row 1 pixels are unaffected by the row 2 pulse, and remain in the state they were set to during the row 1 pulse. This may be repeated for the entire series of rows in a sequential fashion to produce the frame. Generally, the frames are refreshed and/or updated with new display data by continually repeating this process at some desired number of frames per second. A wide variety of protocols for driving row and column electrodes of pixel arrays to produce display frames are also well known and may be used in conjunction with the present invention.

Figures 3, 4:
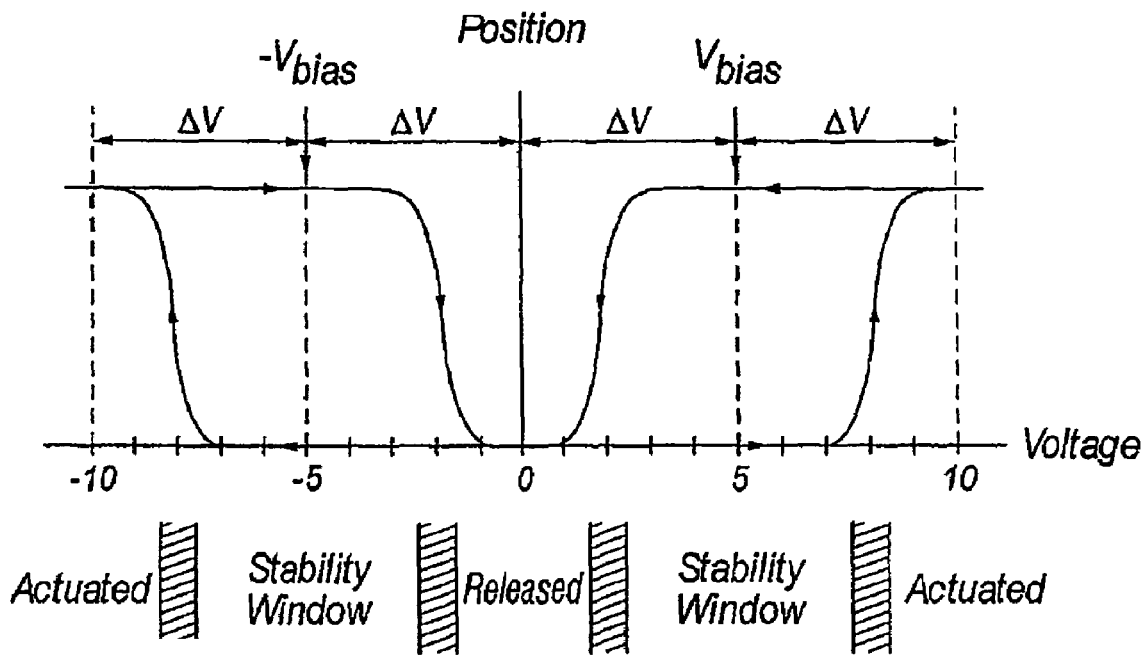
FIG. 3 is a diagram of movable mirror position versus applied voltage for one exemplary embodiment of an interferometric modulator of FIG. 1.
FIG. 4 is an illustration of a set of row and column voltages that may be used to drive an interferometric modulator display.

FIGS. 4 and 5 illustrate one possible actuation protocol for creating a display frame on the 3×3 array of FIG. 2. FIG. 4 illustrates a possible set of column and row voltage levels that may be used for pixels exhibiting the hysteresis curves of FIG. 3. In the FIG. 4 embodiment, actuating a pixel involves setting the appropriate column to $-V_{bias}$, and the appropriate row to $+?$ V, which may correspond to −5 volts and +5 volts respectively. Releasing the pixel is accomplished by setting the appropriate column to $+V_{bias}$, and the appropriate row to the same $+?$ V, producing a zero volt potential difference across the pixel. In those rows where the row voltage is held at zero volts, the pixels are stable in whatever state they were originally in, regardless of whether the column is at $+V_{bias}$, or $-V_{bias}$.

Figure 5A:
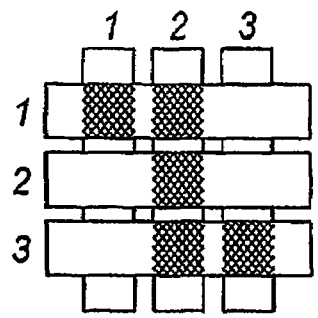
FIGS. 5A and 5B illustrate one exemplary timing diagram for row and column signals that may be used to write a frame of display data to the 3×3 interferometric modulator display of FIG. 2.
Figure 5B:
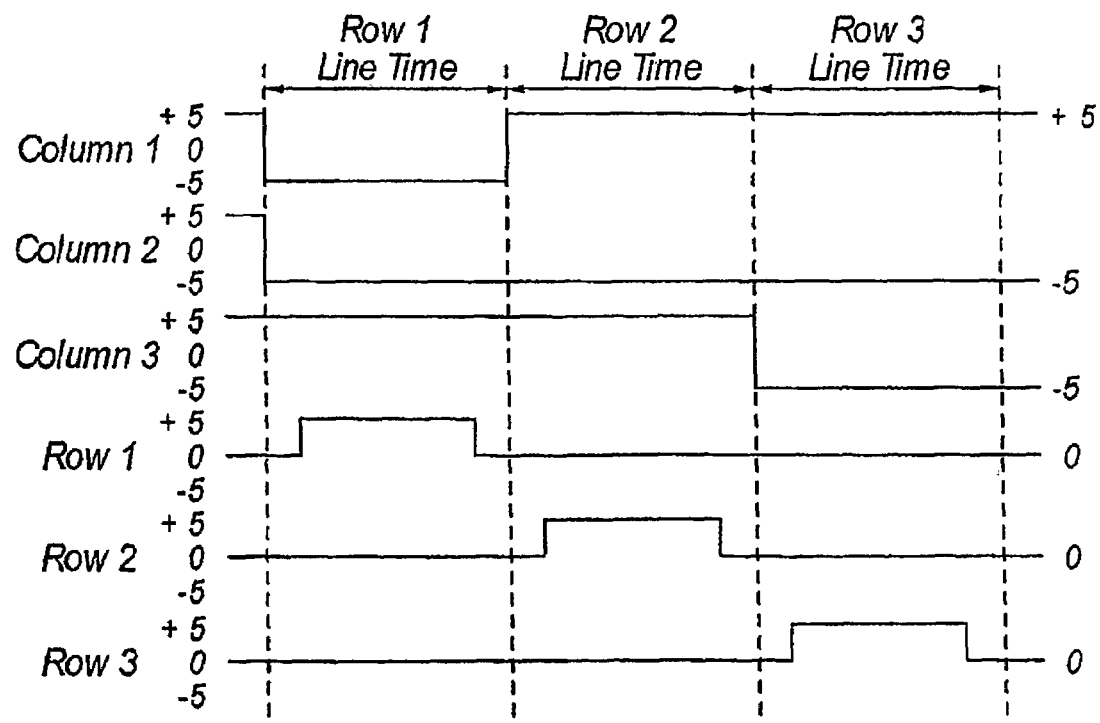

FIG. 5B is a timing diagram showing a series of row and column signals applied to the 3×3 array of FIG. 2 which will result in the display arrangement illustrated in FIG. 5A, where actuated pixels are non-reflective. Prior to writing the frame illustrated in FIG. 5A, the pixels can be in any state, and in this example, all the rows are at 0 volts, and all the columns are at +5 volts. With these applied voltages, all pixels are stable in their existing actuated or released states.

In the FIG. 5A frame, pixels (1,1), (1,2), (2,2), (3,2) and (3,3) are actuated. To accomplish this, during a "line time" for row 1, columns 1 and 2 are set to −5 volts, and column 3 is set to +5 volts. This does not change the state of any pixels, because all the pixels remain in the 3-7 volt stability window. Row 1 is then strobed with a pulse that goes from 0, up to 5 volts, and back to zero. This actuates the (1,1) and (1,2) pixels and releases the (1,3) pixel. No other pixels in the array are affected. To set row 2 as desired, column 2 is set to −5 volts, and columns 1 and 3 are set to +5 volts. The same strobe applied to row 2 will then actuate pixel (2,2) and release pixels (2,1) and (2,3). Again, no other pixels of the array are affected. Row 3 is similarly set by setting columns 2 and 3 to −5 volts, and column 1 to +5 volts. The row 3 strobe sets the row 3 pixels as shown in FIG. 5A. After writing the frame, the row potentials are zero, and the column potentials can remain at either +5 or −5 volts, and the display is then stable in the arrangement of FIG. 5A. It will be appreciated that the same procedure can be employed for arrays of dozens or hundreds of rows and columns. It will also be appreciated that the timing, sequence, and levels of voltages used to perform row and column actuation can be varied widely within the general principles outlined above, and the above example is exemplary only, and any actuation voltage method can be used with the present invention.

Figure 6A:
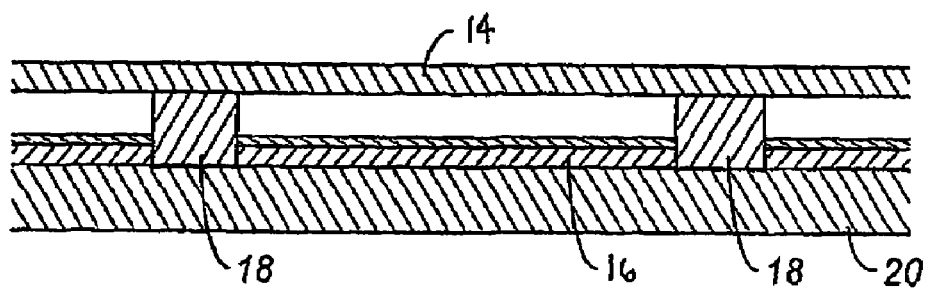
FIG. 6A is a cross section of the device of FIG. 1.
Figure 6B:
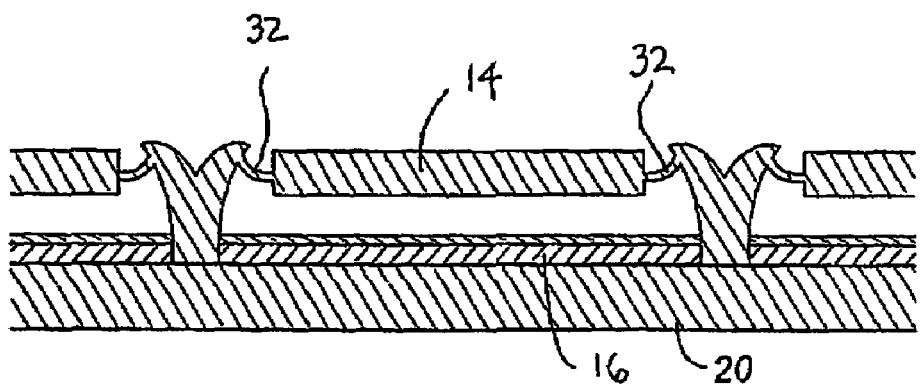
FIG. 6B is a cross section of an alternative embodiment of an interferometric modulator.
Figure 6C:
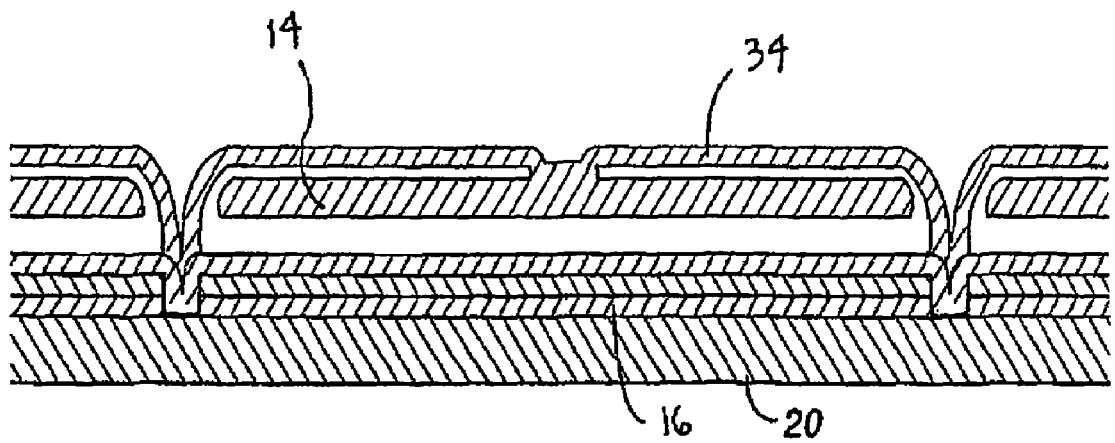
FIG. 6C is a cross section of another alternative embodiment of an interferometric modulator.

The details of the structure of interferometric modulators that operate in accordance with the principles set forth above may vary widely. For example, FIGS. 6A-6C illustrate three different embodiments of the moving mirror structure. FIG. 6A is a cross section of the embodiment of FIG. 1, where a strip of metal material 14 is deposited on orthogonally extending supports 18. In FIG. 6B, the moveable reflective material 14 is attached to supports at the corners only, on tethers 32. In FIG. 6C, the moveable reflective material 14 is suspended from a deformable layer 34. This embodiment has benefits because the structural design and materials used for the reflective material 14 can be optimized with respect to the optical properties, and the structural design and materials used for the deformable layer 34 can be optimized with respect to desired mechanical properties. The production of various types of interferometric devices is described in a variety of published documents, including, for example, U.S. Published Application 2004/0051929. A wide variety of well known techniques may be used to produce the above described structures involving a series of material deposition, patterning, and etching steps.

Exemplary spatial light modulator arrays provide the capability to individually address and switch selected modulator elements between at least two states with different reflection and transmission properties. In certain embodiments, each spatial light modulator of the array can be optimized to switch at least one corresponding wavelength from a reflective "on" state to a non-reflective "off" state. The modulators of such an array can be used in pixels of an electronic display device, either black-and-white or color.

In one embodiment, an interferometric modulator comprises a fixed surface and a movable surface substantially parallel to the fixed surface. In the reflective "on" state, the movable surface is spaced a first distance from the fixed surface in a direction substantially perpendicular to the fixed surface. In the non-reflective "off" state, the moveable surface is spaced a second distance, different from the first distance, from the fixed surface in a direction substantially perpendicular to the fixed surface.

In one embodiment, the reflective "on" state of a black-and-white display reflects a plurality of wavelengths which sum to produce visible white light, and the "off" state is substantially non-reflective for the plurality of wavelengths. For color displays, the reflective "on" state for each modulator is reflective of one or more wavelengths corresponding to a particular corresponding color (e.g., red, green, and blue).

In one embodiment, the color reflected by a modulator element in the actuated state is mainly determined by the optical path length of the dielectric layer, which is approximately the thickness of the dielectric layer times the index of refraction of the dielectric material. In general, the thickness required for both the dielectric layer and the air gap to obtain the desired colors depends on the materials used in the fixed and movable layers. Thus, the thicknesses of the dielectric layer and air gap discussed herein with respect to certain embodiments are exemplary. These thicknesses may vary depending on particular materials chosen for the dielectric and other characteristics of the particular modulator elements. Accordingly, when different dielectric materials are used in modulator elements, the optical path distance may change and the colors reflected by the modulator elements may also change. In one embodiment, the fixed layer of a modulator element comprises an Indium Tin Oxide transparent conductor layer, a Cr partially reflective layer, an Al reflective layer, and a dielectric stack comprising primarily SiO2.

Figure 7:
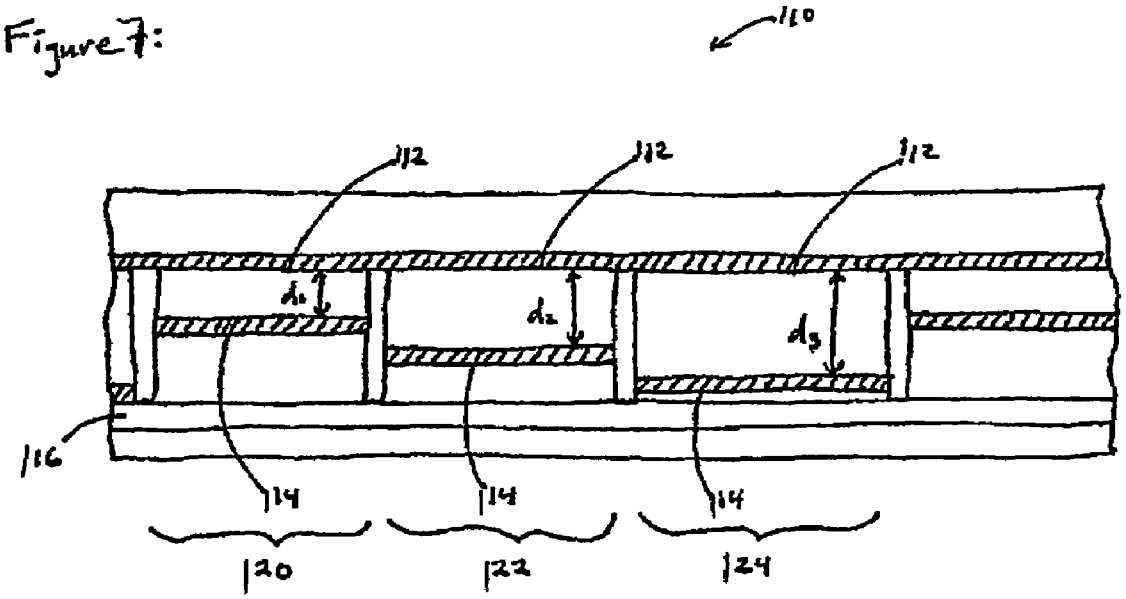
FIG. 7 schematically illustrates an interferometric modulator array having three sets of modulator elements, each set having a corresponding gap distance.

For certain embodiments of the interferometric modulator arrays, a color display is produced using three sets of modulator elements, each set having a different gap distance so as to switch a corresponding color. For example, as schematically illustrated by FIG. 7, an interferometric modulator array 110 for use in a color display comprises a plurality of modulator elements, where each modulator element comprises a fixed surface 112 and a movable surface 114. Between the fixed surface 112 and the movable surface 114 a gap is defined, wherein a gap distance is the distance between the fixed surface 112 and the movable surface 114. The interferometric modulator array 110 further comprises a planarization layer 116 which provides a planar surface for subsequent processing of the interferometric modulator array 110.

In the embodiment of FIG. 7, the modulator array comprises three modulator element 120,122,124. Each of these modulator elements 120,122,124 may be configured to reflect a different color so that the combination of the three modulator elements 120,122,124 provides three colors. For example, the modulator element 120 may be configured to reflect only a first color, the modulator element 122 may be configured to reflect only a second color, and the modulator element 124 may be configured to reflect only a third color. In certain embodiments, the first, second, and third colors are red, green, and blue, while in other embodiments, the first, second, and third colors are cyan, magenta, and yellow.

In the embodiment of FIG. 7, the first gap distance $d_1$ is set so that the first modulator element 120 is substantially reflective to a first color (e.g., red), and non-reflective to a second and third color. For the second modulator element 122, the distance between the movable surface 114 and the fixed surface 112 is selectively switched between a second gap distance $d_2$ and approximately zero. In the embodiment of FIG. 7, the second gap distance $d_2$ is set so that the second modulator element 122 is substantially reflective to a second color (e.g., green), and non-reflective to a first and third color. For the third modulator element 124, the distance between the movable surface 114 and the fixed surface 112 is selectively switched between a third gap distance $d_3$ and approximately zero. In the embodiment of FIG. 7, the third gap distance $d_3$ is set so that the third modulator element 124 is substantially reflective to a third color (e.g., blue), and non-reflective to a first and second color.

As may be appreciated by those of skill in the art, fabrication of a multi-color modulator array, such as array 110, for example, typically involves use of three masks to pattern the sacrificial layers to produce the three different gap distances (corresponding to the three colors, e.g., red, green, and blue) between the fixed surface 112 and the movable surface 114 of the three modulator elements 120, 122, 124. In addition, building the mechanical structure of the modulator elements with an uneven back structure increases the chances of misalignment and tilt of the modulator elements. In addition to the complexity of fabricating modulator elements with three different gap distances, production of a deeply saturated color gamut (i.e., the set of possible colors within a color system) may be difficult. For example, a modulator element having a gap distance set to reflect red wavelengths of light may be fabricated using additional masking steps that increase the depth of color reflected by the modulator element. Thus, in some embodiments, the fabrication process includes production of a multi-color array of modulator elements with different gap distances and requires additional steps to enhance the color gamut of the array.

Figure 8:
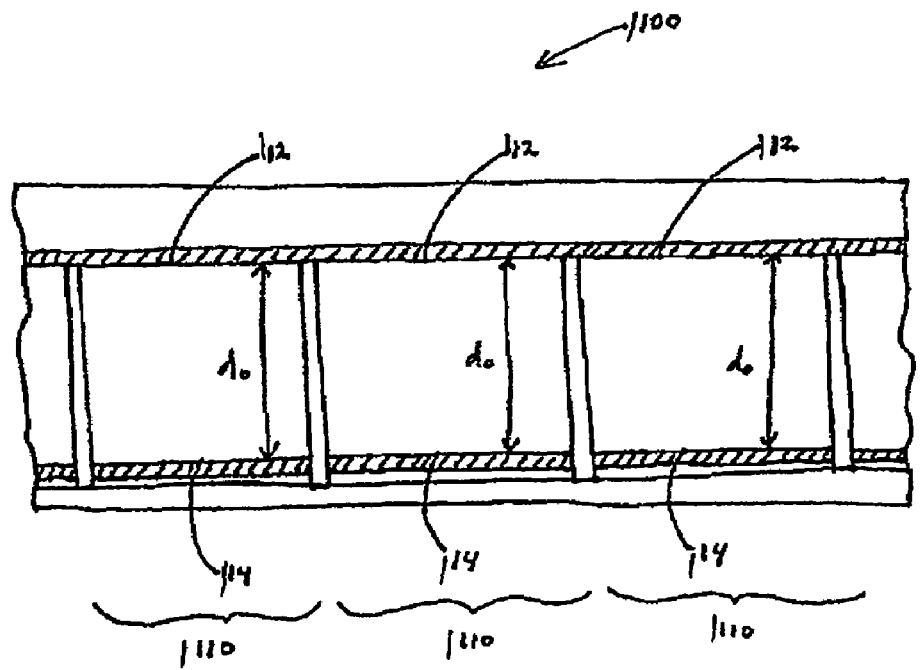
FIG. 8 schematically illustrates one embodiment of an interferometric modulator array in which substantially all of the modulator elements have substantially equal gap distances.

FIG. 8 schematically illustrates one embodiment of an interferometric modulator array 1100 in which substantially all of the modulator elements 1110 have substantially the same gap distance $d_0$. The gap distance $d_0$ is selected to provide substantial reflectance by the modulator element 1110 to a selected range of wavelengths in the visible light portion of the spectrum. For example, in certain embodiments, the gap distance $d_0$ is approximately equal to one micron. The gap distance $d_0$ has been selected so as to produce a reflectance spectrum that includes multiple peaks.

Figure 9:
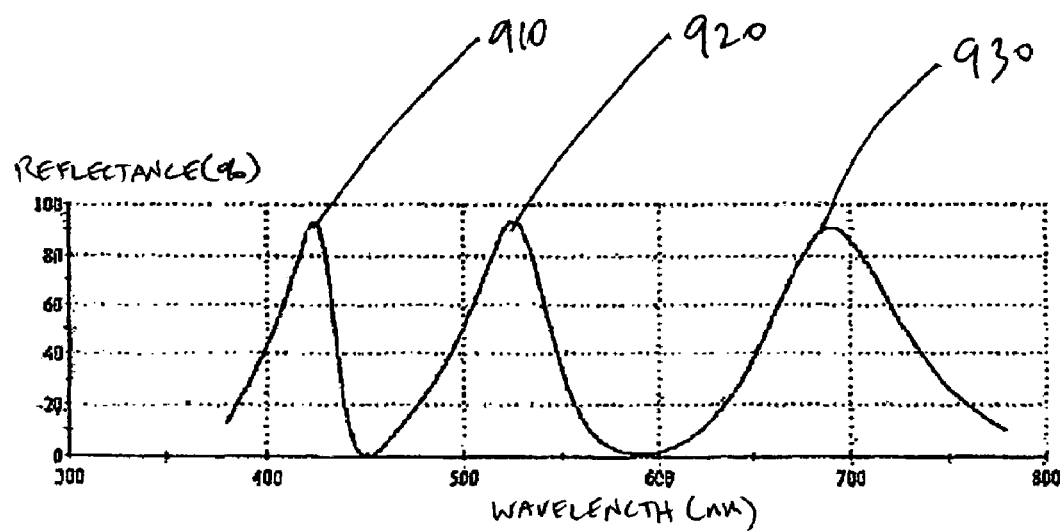
FIG. 9 is a graph of an exemplary reflectance spectrum from an interferometric modulator element having a gap distance $d_0$ approximately equal to one micron.

FIG. 9 is a graph of an exemplary reflectance spectrum from a modulator element 1110 having a gap distance $d_0$ approximately equal to one micron. In this embodiment, the amount of light reflected from the modulator element 1110 is approximately 20-25% of the incoming light. In the graph of FIG. 9, the horizontal axis indicates the wavelengths of light that are reflected from the exemplary modulator element 1110 and the vertical axis indicates the percent reflectance from the exemplary modulator element 1110. As illustrated in the graph of FIG. 9, the reflectance spectrum of the modulator element 1110 includes three reflectivity peaks at about 430 nanometer, 525 nanometers, and 685 nanometers. Thus, the modulator element 1110 is said to have a reflectance spectrum including three reflectivity lines, or simply "lines," where a line is a peak in reflectivity. In particular, the reflectance spectrum illustrated in FIG. 9 includes a first line 910, a second line 920, and a third line 930. In other embodiments, the gap between the fixed and moveable surface of the modulator element 1110 may be adjusted to produce more or less reflectivity lines. For example, in certain embodiments the selected range of wavelengths comprises a range of colors, thus producing multiple reflectivity lines associated with the range of colors. In certain embodiments, the selected range of wavelengths comprises two or more colors so that the reflectivity spectrum of the modulator element includes at least one reflectivity line associated with each of the two or more colors. In certain embodiments, the selected range of wavelengths comprises a selected color of light (e.g., red, green, or blue light). In certain embodiments, the at least one wavelength comprises first-order light, while in other embodiments, the at least one wavelength comprises higher-order (e.g., second-, third-, fourth-, or fifth-order) light. In one embodiment, at the higher order colors, e.g., $6^{th}$ order, 3-6 reflectance peaks can appear in the visible spectra simultaneously. FIGS. 10A-10D are graphs of exemplary reflectance spectrums from modulator elements having varying gaps between their respective reflective and semi-reflective surfaces. FIGS. 10A-10D each illustrate the reflectance (R), shown on the vertical axis, as a function of wavelength ($\lambda$), shown on the horizontal axis. As indicated in FIG. 10A-10D, by adjusting the gap of the modulator element, the reflectance spectrum of the modulator element may be adjusted to include more than one line and the peak reflectivity wavelength of the one or more lines may also be adjusted.

Figure 10A:
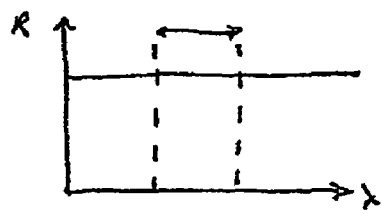
FIGS. 10A-10D are graphs of various reflectance spectra from interferometric modulator elements compatible with embodiments described herein.
Figure 13A:
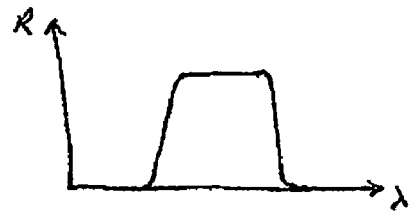
FIGS. 13A-13D are graphs of the resultant reflectance spectra resulting from the combination of a color filter with the interferometric modulator elements corresponding to FIGS. 10A-10D.
Figure 10B:
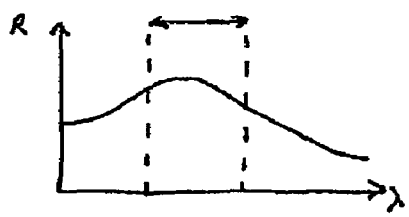
Figure 13B:
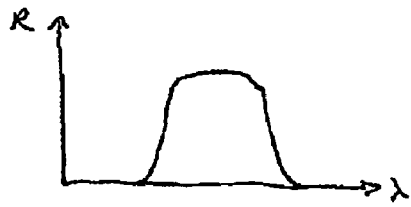
Figure 10C:
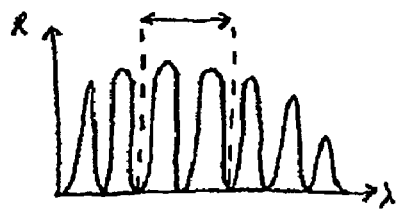
Figure 13C:
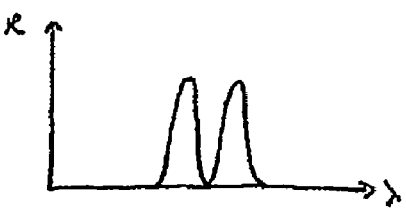
Figure 10D:
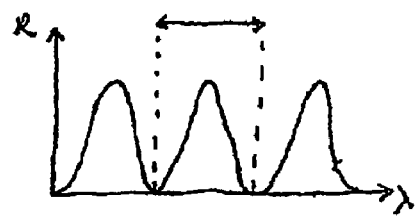
Figure 13D:
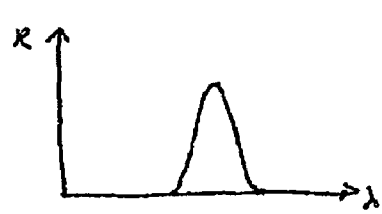

The dashed lines in FIGS. 10A-10D denote a selected range of wavelengths that may be filtered by a color filter, for example. In certain embodiments, the selected range of wavelengths comprises a generally broadband wavelength region (e.g., white light), as schematically illustrated by FIG. 10A. In certain embodiments, the selected range of wavelengths comprises a broadband wavelength region with a single line peaked at a selected wavelength (e.g., first-order red or first-order green), as schematically illustrated by FIG. 10B. In certain embodiments, the selected range of wavelengths comprises a broadband wavelength region comprising a plurality of lines corresponding to different colors, as schematically illustrated by FIG. 10C. In certain embodiments, the selected range of wavelengths comprises a wavelength region with a plurality of lines corresponding to colors of various orders, as schematically illustrated by FIG. 10D. Other selected ranges of wavelengths are compatible with embodiments described herein.

Figure 11A:
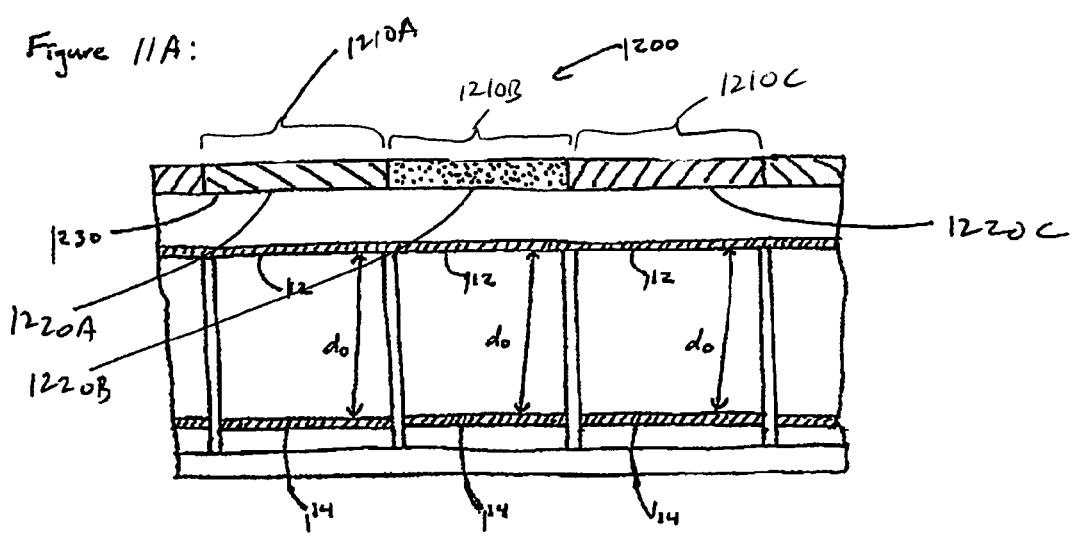
FIGS. 11A and 11B schematically illustrate exemplary embodiments of a display device comprising an array of interferometric modulator elements and an array of color filters.
Figure 11B:
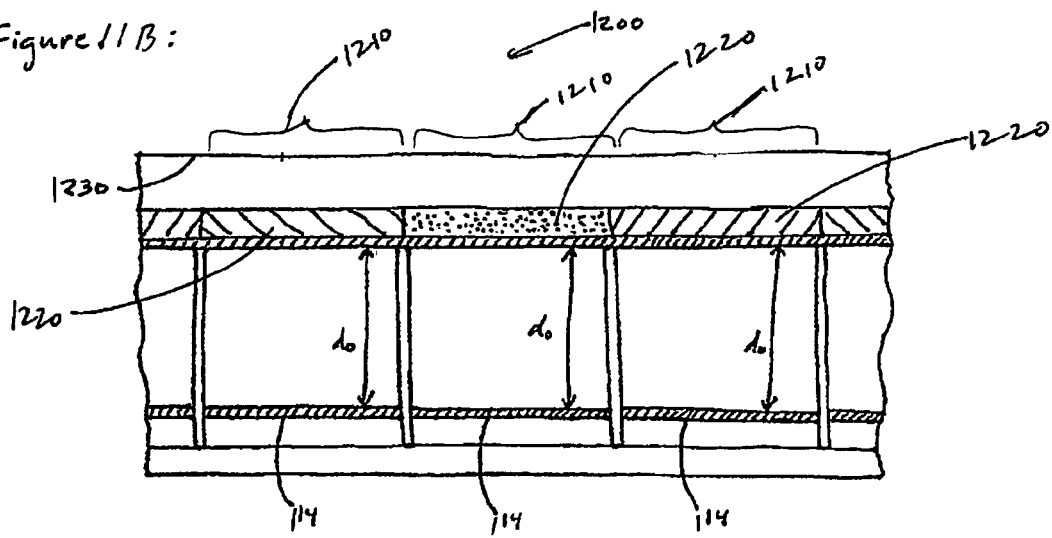

FIGS. 11A and 11B schematically illustrate exemplary embodiments of a display device 1200 comprising an array of interferometric modulator elements 1210 and an array of color filters 1220. FIG. 11A illustrates three modulator elements 1210A, 1210B, and 1210C and three color filters 1220A, 1220B, and 1220C. In the embodiment of FIGS. 11A and 11B, each modulator element 1210 is individually addressable so as to be switched between a first state in which the modulator element 1210 is substantially reflective to at least one wavelength and a second state in which the modulator element 1210 is substantially non-reflective to the at least one wavelength. In the embodiment schematically illustrated by FIGS. 11A and 11B, each of the modulator elements 1210 has the same gap distance $d_0$ such that each modulator element 1210 switches the same at least one wavelength as do the other modulator elements 1210.

Each color filter 1220 is positioned such that light reflected from a corresponding modulator element 1210 propagates through the corresponding color filter 1220. In the embodiment schematically illustrated by FIG. 11A, the color filters 1220 are positioned outside an outer surface 1230 of the array of interferometric modulator elements 1210. In the embodiment schematically illustrated by FIG. 11B, the color filters 1220 are positioned within the outer surface 1230 and are integral with the array of interferometric modulator elements 1210.

Each color filter 1220 has a characteristic transmittance spectrum in which a selected range of wavelengths is substantially transmitted through the color filter 1220 while other wavelengths are substantially not transmitted (e.g., either reflected or absorbed) by the color filter 1220. In certain embodiments, the array of color filters 1220 comprises three subsets of the color filters 1220. Each color filter 1220 of the first subset has a first transmittance spectrum, each color filter 1220 of the second subset has a second transmittance spectrum, and each color filter 1220 of the third subset has a third transmittance spectrum. In certain embodiments, the first, second, and third subsets of the color filters 1220 have transmittance spectra corresponding to substantial transmittance of red, green, and blue light, respectively. In certain other embodiments, the first, second, and third subsets of the color filters 1220 have transmittance spectra corresponding to substantial transmittance of cyan, magenta, and yellow light, respectively. Accordingly, by placing the color filters 1220 with different transmittance spectrums on the modulator elements 1210, modulator elements 1210 having the same gap distance may have different reflectance spectrums. Thus, by combining color filters 1220 corresponding to three colors (e.g., red/green/blue or cyan/magenta/yellow) with the modulator elements having substantially equal gap distances (e.g., the modulator elements schematically illustrated by FIGS. 8, 11A, and 11B), certain such embodiments advantageously provide reflectivity spectrums including three highly saturated color lines without patterning the structure of the interferometric modulator elements. In certain such embodiments, because the gap of each modulator element is substantially the same, common voltage levels may be used to activate and deactivate selected modulator elements. Accordingly, voltage matching among the modulator elements is simplified.

In certain embodiments, color filters 1220 are combined with two or more sets of modulator elements having different gap distances (e.g., such as the modulator elements schematically illustrated by FIG. 7), wherein each set of modulator elements reflects a different range of wavelengths. In certain such embodiments, the color filters 1220 serve to tailor the reflectance spectra of the modulator element/color filter combination (e.g., by removing unwanted tails or lines from the resultant reflectance spectrum). For example, in embodiments in which a set of modulator elements each has a reflective "on" state which substantially reflects a range of wavelengths corresponding to red light but is substantially non-reflective of other wavelengths, a color filter having a transmittance spectra with a more narrow range of transmitted wavelengths of red light can result in a more deeply saturated red color from the reflective "on" state of the modulator element. In certain embodiments, the color filter has a transmittance of less than 100% of the wavelengths which are substantially transmitted by the color filter. In certain such embodiments, the decrease in the overall display brightness due to the less-than-100% transmittance of the color filter is acceptable to generate the deeply saturated color.

FIG. 12 is a graph of transmittance spectra for a set of three exemplary color filter materials compatible with embodiments described herein. The exemplary color filter materials of FIG. 12 are pigmented photosensitive color filter resins available from Brewer Science Specialty Materials of Rolla, Mo. The solid line of FIG. 12 corresponds to the transmission spectrum of a 1.2-micron thick film of PSCBlue®, the dashed line of FIG. 12 corresponds to the transmission spectrum of a 1.5-micron thick film of PSCGreen®, and the dash-dot line of FIG. 12 corresponds to the transmission spectrum of a 1.5-micron thick film of PSCRed®. Any type of color filter know in the art, such as a pigment-based or interference-based multilayer dielectric filter, for example, is compatible with embodiments described herein.

The thicknesses of the color filter materials are selected to provide the desired transmission. When used with transmissive displays (e.g., liquid-crystal displays) in which a backlight source is used to produce light which is transmitted through the display element, the light propagates through the color filter material only once. When used with reflective displays (e.g., reflective interferometric displays), the light propagates through the color filter material twice: once when incident on the modulator element and once when propagating away from the modulator element. Thus, the thickness of a color filter material for a reflective display is typically approximately one-half the thickness of the color filter material when used with a transmissive display. Any type of color filter know in the art, such as a pigment-based or interference-based multilayer dielectric filter, for example, is compatible with embodiments described herein.

The dashed lines in FIGS. 10A-10D schematically illustrate a range of wavelengths substantially transmitted by a selected color filter. FIGS. 13A-13D are graphs of the reflectance spectra resulting from the combination of this selected color filter with the modulator elements 1210 corresponding to FIGS. 10A-10D. The resultant reflectance spectrum from the combination of the modulator elements 1210 corresponding to the reflectance spectrums illustrated in FIGS. 10A-10D and this selected color filter corresponds to a convolution of the reflectance spectrum of the modulator elements 1210 and the transmittance spectrum of the color filter. The bandpass characteristic of the selected color filter allows the modulator elements 1210 to be used as separate color contributions to the pixels of the display device.

With reference to FIGS. 11A and 11B, each of the modulator elements 1210 may have a common gap that is sized so that the reflectance spectrum of the modulator elements 1210 includes three distinct reflectance lines, such as is illustrated in FIGS. 9 and 10D, for example. In one embodiment, each of these three lines corresponds with red, green, or blue wavelengths. Accordingly, without the color filters 1220 the modulator elements 1210 would each have reflectance spectra including the three reflectance lines and the modulator elements 1210 would each reflect white light when in an "on" state. However, with the addition of the color filters 1220, the modulator elements 1210 may be altered to vary their reflectance spectrums. For example, each of the color filters 1220 may be selected to transmit only a certain range of wavelengths, such as red, green, or blue wavelengths. In particular, color filter 1220A may be selected to transmit only a range of red wavelengths, color filter 1220B may be selected to transmit only a range of green wavelengths, and color filter 1220A may be selected to transmit only a range of blue wavelengths. Accordingly, with the addition of the color filters 1220A-1220C, the modulator elements 1210 each provide different reflectance spectrums. In particular, modulator element 1210A has a single reflectance line at the range of blue selected by the color filter 1220A, modulator element 1210B has a single reflectance line at the range of green selected by the color filter 1220B, and modulator element 1210C has a single reflectance line at the range of red selected by the color filter 1220C.

In one embodiment, each modulator element includes a single color filter having a selected transmittance spectrum. In another embodiment, multiple modulator elements share a single color filter, such that the output of the multiple modulator elements are each filtered in the same way. In another embodiment, a single modulator element includes multiple color filters.

Figure 14:
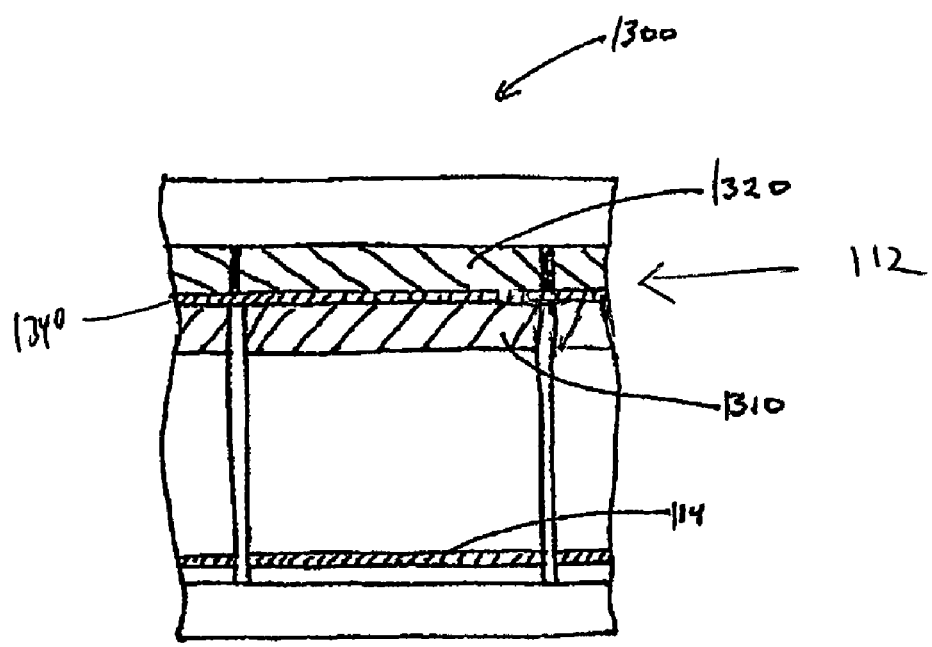
FIG. 14 schematically illustrates an interferometric modulator element having a dielectric layer compatible with embodiments described herein.

FIG. 14 schematically illustrates an interferometric modulator element 1300 compatible with embodiments described herein. In the embodiment of FIG. 14, the modular element 1300 comprises a fixed layer 112 and a movable layer 114. In this embodiment, the fixed layer 112 includes a reflecting surface on a layer that forms a partial reflector 1340. A dielectric layer 1310 is formed over this partial reflector 1340. In one embodiment, the partial reflector 1340 comprises a thin layer of chromium and the dielectric layer 1310 comprises silicon dioxide. In other embodiments, the partial reflector 1340 and dielectric layer 1310 may comprise any other suitable materials.

In certain embodiments, the materials and dimensions chosen for the dielectric layer 1310 vary the optical path length of the light within the modulator element 1300 and, accordingly, adjust the reflectance spectrum of the modulator element 1300. Various materials and thicknesses of the dielectric layer 1310 are compatible with embodiments described herein. As described in further detail below, an optical path length of the modulator element 1300 may be adjusted by changing the thickness of the air gap. Alternatively, the optical path length may be altered by changing the thickness or material of the dielectric layer 1310.

In one embodiment, the dielectric layer of the modulator element is sized so that when the modulator is in the closed position, light incident on the modulator element undergoes destructive interference and a viewer sees the modulator element as black. In such embodiments, the dielectric layer thickness may be about 300 to 700 Angstroms in order to provide the proper destructive interference when the modulator element is in the closed position.

In general, the power to switch a modulator element between two states depends in part on the capacitance between the electrically conductive portions associated with the fixed and movable layers 112, 114. Thus, by decreasing the gap distance, the capacitance between these surfaces is reduced, the switching power may also be reduced, and the total power consumption of a display comprising one or more modulator elements may be reduced. In the embodiment of FIG. 14, the dielectric layer 1310 is sized larger than 700 Angstroms so that the air gap may be decreased while maintaining the desired optical path length for the modulator element to causes destructive interference of visible light when in the closed state. Thus, with a smaller air gap, the power consumed by the modulator element may be decreased.

In the embodiment of FIG. 14, the dielectric layer 1310 has a thickness of about 2200 to 2500 Angstroms, which may adjust the reflectance spectrum of the modulator element 1300 when in the closed state to be in a range of wavelengths between first-order red light and second-order blue light. This range of wavelengths is not a true black, because it includes the tails of the first-order red light and the second-order blue light, resulting in a "deep purple" color. This deep purple may sufficiently resemble black to be used as a black state of a pixel. However, in certain embodiments, as schematically illustrated by FIG. 14, the modulator element 1300 includes a color filter 1320 having a transmittance spectrum that does not transmit the tails of the first-order red light and the second-order blue light. Such embodiments provide a non-reflective closed state of the modulator element 1300 which more closely approximates true black. The color filter 1320 may further be selected to transmit only a selected wavelength range when the modulator element 1300 is in the open state. The modulator element 1300 may also provide lower capacitance, and thus consume less power, than a similar modulator element 1300 having a thinner dielectric.

Figure 15:
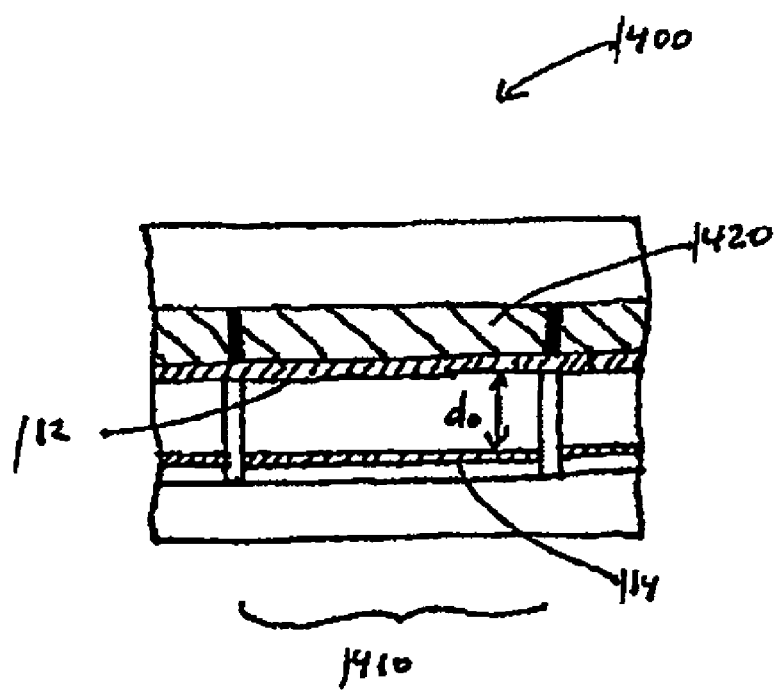
FIG. 15 schematically illustrates another embodiment of a display device with an array of interferometric modulator elements compatible with embodiments described herein.

FIG. 15 schematically illustrates a portion of another embodiment of a display device 1400 including an array of interferometric modulator elements 1410 compatible with embodiments described herein. In this embodiment, the gap distance when the modulator element is in the reflective "on" state is less than the gap distance when the modulator element is in the non-reflective "off" state. The modulator element 1400 includes a dielectric layer that is thin enough to frustrate interference effects between the partially reflective and fully reflective layers and to therefore reflect substantially all wavelengths of light with equal intensity, when the modulator element is in the "on" state. In one embodiment, the dielectric thickness is about 100 Angstroms. In another embodiment, the dielectric thickness is in the range of about 50 to 200 Angstroms.

In one embodiment, a gap distance $d_0$ is set sufficiently small so that in the reflective "on" state the modulator element 1400 provides approximately 100% reflectance of visible light, which may be significantly more reflectance than from embodiments with larger gap distances. Accordingly, certain embodiments of the display device 1400 may provide a black-and-white display with improved reflectance. Color filters 1420 may be used to tune the color spectrum of the modulator elements 1410 in the same manner as described above.

In the embodiment of FIG. 15, the gap distance in the non-reflective "off" state is larger than $d_0$ and is selected to not reflect a broad range of wavelengths. In particular, the gap distance is such that light undergoes destructive interference between the fixed and movable surfaces of the modulator elements 1410, causing substantially no light to reflect from the modulator element 1410 when in the "off" state. In one embodiment, the gap distance in the "off" state is in the range of about 500 to 1200 Angstrom.

Certain embodiments described herein advantageously provide highly saturated colors using a single gap distance for substantially all of the modulator elements of the interferometric modulator array. Certain embodiments described herein advantageously do not require special patterning or masking of the reflective layer in modulator elements configured to have reflectivity lines in the red wavelengths. Certain embodiments advantageously provide a sufficiently large gap distance to be tuned to eliminate unwanted portions of the visible spectrum. Certain embodiments advantageously provide a sufficiently small dielectric thickness to reflect approximately 100% of a broad range of visible wavelengths. Certain embodiments advantageously provide a low-capacitance interferometric modulator structure.

Various embodiments of the invention have been described above; however, other embodiments are possible. For example, in other embodiments, other types of light-modulating elements other than interferometric modulators (e.g., other types of MEMS or non-MEMs, reflective or non-reflective structures) may be used.

Accordingly, although this invention has been described with reference to specific embodiments, the descriptions are intended to be illustrative of the invention and are not intended to be limiting. Various modifications and applications may occur to those skilled in the art without departing from the true spirit and scope of the invention.

What is claimed is:

1. A display region comprising:
a plurality of display elements, each of the display elements comprising a partially reflective fixed surface and a fully reflective moveable surface configured so as to define a cavity therebetween that is sufficiently large so that each cavity has a reflectivity spectrum including multiple lines; and
a color filter associated with at least one of the display elements, wherein the color filter is configured to allow only a desired one of the lines to pass through the color filter, the display region being configured so that a user views the light that passes through the color filter.

2. The display region of claim 1, wherein the distance between the fixed and moveable surfaces of the display elements is sufficiently large so that light incident on each of the display elements has maximum reflectivity lines in red, green, and blue visible light wavelengths.

3. The display region of claim 2, further comprising a plurality of color filters, wherein a first group of the color filters is configured to transmit wavelengths of visible light in only the red visible light wavelengths, a second group of the color filters is configured to transmit wavelengths of visible light only in the green visible light wavelengths, and a third group of the color filters is configured to transmit wavelengths of visible light only in the blue visible light wavelengths.

4. The display region of claim 1, wherein the distance between the fixed and moveable surfaces of the display elements is sufficiently large so that visible light incident on each of the display elements has maximum reflectivity lines in the ranges of about 625 to 740 nanometers, about 500 to 565 nanometers, and about 440 to 485 nanometers.

5. The display region of claim 4, further comprising a plurality of color filters, wherein a first group of the color filters is configured to transmit wavelengths of visible light only in the range of about 625 to 740 nanometers, a second group of the color filters is configured to transmit wavelengths of visible light only in the range of about 500 to 565 nanometers, and a third group of the color filters is configured to transmit wavelengths of visible light only in the range of about 440 to 485 nanometers.

6. The display region of claim 1, further comprising a plurality of color filters, wherein a first group of the color filters is configured to transmit wavelengths of light only in the range of about 610 to 630 nanometers, a second group of the color filters is configured to transmit wavelengths of light only in the range of about 530 to 550 nanometers, and a third group of the color filters is configured to transmit wavelengths of light only in the range of about 440 to 460 nanometers.

7. The display region of claim 1, wherein the distance between the fixed and moveable surface of the display elements is in the range of about 10,000 to 15,000 Angstroms.

8. The display region of claim 1, wherein the reflective surface of each of the plurality of display elements consists of the same materials.

9. A display region comprising:
a plurality of display elements, each of the display elements comprising a fixed surface and a moveable surface configured so as to define a cavity therebetween that is sufficiently large so that each display element has a reflectivity spectrum including multiple lines; and
a color filter associated with at least one of the display elements, wherein the color filter is configured to allow only a desired one of the lines to pass through the color filter, the display region being configured so that a user views the light that passes through the color filter wherein the distance between the fixed and moveable surfaces are substantially equal in each of the plurality of display elements when the display elements are in an open state.

10. The display region of claim 3, wherein the distance between the fixed and moveable surfaces of the display elements is sufficiently large so that light incident on each of the display elements has maximum reflectivity lines in red, green, and blue visible light wavelengths.

11. The display region of claim 10, further comprising a plurality of color filters, wherein a first group of the color filters is configured to transmit wavelengths of visible light in only the red visible light wavelengths, a second group of the color filters is configured to transmit wavelengths of visible light only in the green visible light wavelengths, and a third group of the color filters is configured to transmit wavelengths of visible light only in the blue visible light wavelengths.

12. The display region of claim 3, wherein the distance between the fixed and moveable surfaces of the display elements is sufficiently large so that visible light incident on each of the display elements has maximum reflectivity lines in the ranges of about 625 to 740 nanometers, about 500 to 565 nanometers, and about 440 to 485 nanometers.

13. The display region of claim 3, wherein the moveable surface of each of the display elements is fully reflective.

14. An interferometric modulator configured to output multiple lines in a range of wavelengths that are visible to a human eye, the modulator comprising:
a partially reflective surface;
a fully reflective surface located with respect to the partially reflective surface such that the fully and partially reflective surfaces having a gap therebetween have a reflectivity spectrum including multiple lines; and
a filter configured to transmit only a desired one of the multiple lines, wherein the filter is disposed so as to receive light reflected from at least one of the surfaces such that the received light is transmitted through the filter toward a viewer.

15. The interferometric modulator of claim 14, wherein the gap between the partially reflective and reflective surfaces is greater than about 5000 Angstrom.

16. The interferometric modulator of claim 14, wherein the filter comprises one of a red color filter, a green color filter, and a blue color filter.

17. An interferometric modulator comprising:
means for partially reflecting light;
means for fully reflecting light, wherein the means for partially reflecting and the means for fully reflecting together provide a reflectivity spectrum including multiple lines; and
means for filtering only a desired one of the multiple lines for viewing by a human eye.

18. The interferometric modulator of claim 17, wherein the means for partially reflecting light comprises a partially reflective surface and the means for fully reflecting light comprises a fully reflective surface.

19. The interferometric modulator of claim 17, wherein the means for partially reflecting and the means for fully reflecting are positioned to define a gap that is sized to provide a reflectivity spectrum including multiple lines.

20. The interferometric modulator of claim 17, wherein the filtering means comprise a color filter.

21. A display region comprising:
a plurality of display elements, each of the display elements comprising a partially reflective fixed surface and a fully reflective moveable surface configured so as to define a cavity therebetween that is sufficiently large so that each display element has a reflectivity spectrum including multiple lines; and
a color filter associated with at least one of the display elements, wherein the color filter is configured to allow a range of wavelengths to pass through the color filter, the display region being configured so that a user views the light that passes through the color filter, wherein the distance between the fixed and moveable surfaces of the display elements is sufficiently large so that light incident on each of the display elements has maximum reflectivity lines in red, green, and blue visible light wavelengths.

22. The display region of claim 21, wherein a distance between the partially reflective fixed surface and the fully reflective moveable surface is sufficiently large so that visible light incident on each of the display elements has maximum reflectivity lines in the ranges of about 625 to 740 nanometers, about 500 to 565 nanometers, and about 440 to 485 nanometers.

23. A display region comprising:
a plurality of display elements, each of the display elements comprising a first surface and a second surface defining a cavity therebetween that is sufficiently large so that each of the display elements has a reflectivity spectrum including multiple lines; and
a color filter associated with at least one of the display elements, wherein the color filter is configured to allow only a desired one of the lines to pass through the color filter, the display region being configured so that a user views the light that passes through the color filter, wherein the distance between the first and second surfaces are substantially equal.

24. The display region of claim 23, wherein the first surface is partially reflective and the second surface is substantially fully reflective.

* * * * *

UNITED STATES PATENT AND TRADEMARK OFFICE
CERTIFICATE OF CORRECTION

| | |
|---|---|
| PATENT NO. | : 7,710,632 B2 |
| APPLICATION NO. | : 11/051258 |
| DATED | : May 4, 2010 |
| INVENTOR(S) | : William J. Cummings |

It is certified that error appears in the above-identified patent and that said Letters Patent is hereby corrected as shown below:

Page 4, Column 2, Line 41 (Other Publications), "Quanum Electronics," should be changed to --Quantum Electronics,--

Page 4, Column 2, Line 50 (Other Publications), "Silicon Micromaching" should be changed to --Silicon Micromachining--

Page 4, Column 2, Line 54 (Other Publications), "Rosonator Channel" should be changed to --Resonator Channel--

Page 5, Column 1, Line 70 (Other Publications), "PA/a/2005/008406 dated" should be changed to --PA/a/2005/009406 dated--

Page 5, Column 2, Line 36 (Other Publications), "pl.physik.tu-berlin.berlin.de/groups/pg279/" should be changed to --pl.physik.tu-berlin.de/groups/pg279/--

Page 5, Column 2, Line 63 (Other Publications), "lnterferometric Modulator" should be changed to --Interferometric Modulator--

Page 5, Column 2, Line 70 (Other Publications), "interfermotric modulation"" should be changed to --interferometric modulation"--

Column 1, Line 25, "and or other" should be changed to --and/or other--

Column 2, Line 31, "or non-MEMs," should be changed to --or non-MEMS,--

Column 6, Line 22, "row to +?V," should be changed to --row to $+\Delta V$,--

Column 6, Line 23, "respectively Releasing" should be changed to --respectively. Releasing--

Column 6, Line 25, "the same +?V," should be changed to --the same $+\Delta V$,--

Column 9, Line 42, "indicated in FIG." should be changed to --indicated in FIGS.--

Column 11, Line 39, "filter know in" should be changed to --filter known in--

Column 14, Line 8, "or non-MEMs," should be changed to --or non-MEMS,--

Column 15, Line 22, "region of claim 3," should be changed to --region of claim 9,--

Signed and Sealed this
Twenty-second Day of November, 2011

David J. Kappos
*Director of the United States Patent and Trademark Office*

CERTIFICATE OF CORRECTION (continued)
U.S. Pat. No. 7,710,632 B2

Column 15, Line 36, "region of claim 3," should be changed to --region of claim 9,--

Column 15, Line 42, "region of claim 3," should be changed to --region of claim 9,--